US011988982B2

(12) United States Patent
Nishida et al.

(10) Patent No.: US 11,988,982 B2
(45) Date of Patent: May 21, 2024

(54) HEATER, HEATING DEVICE, AND IMAGE FORMING APPARATUS

(71) Applicant: CANON KABUSHIKI KAISHA, Tokyo (JP)

(72) Inventors: Satoshi Nishida, Kanagawa (JP); Masahito Omata, Kanagawa (JP); Isamu Takeda, Tokyo (JP); Takao Kume, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/936,279

(22) Filed: Sep. 28, 2022

(65) Prior Publication Data

US 2023/0101858 A1 Mar. 30, 2023

(30) Foreign Application Priority Data

Sep. 30, 2021 (JP) ................................ 2021-160999

(51) Int. Cl.
*G03G 15/20* (2006.01)
*H05B 3/00* (2006.01)

(52) U.S. Cl.
CPC ..... *G03G 15/2039* (2013.01); *G03G 15/2053* (2013.01); *H05B 3/0095* (2013.01); *H05B 2203/007* (2013.01)

(58) Field of Classification Search
CPC ........... G03G 15/2039; G03G 15/2042; G03G 15/2053; H05B 3/0095; H05B 3/145;
(Continued)

(56) References Cited

U.S. PATENT DOCUMENTS 6,336,009 B1 * 1/2002 Suzumi .............. G03G 15/2042 399/67
2006/0024071 A1 * 2/2006 Takami .............. G03G 15/2039 399/33
(Continued)

FOREIGN PATENT DOCUMENTS

JP 2000-147931 A 5/2000
JP 2000-162909 A 6/2000
(Continued)

*Primary Examiner* — Sophia S Chen
(74) *Attorney, Agent, or Firm* — Canon U.S.A., Inc. I.P. Division

(57) ABSTRACT

A heater includes a substrate, a first heating element and a second heating element disposed on a first surface of the substrate, a temperature detection element, and a conductor. The temperature detection element is disposed on a second surface of the substrate opposite the first surface of the substrate. The conductor is disposed on the second surface and connected to the temperature detection element. The first heating element has a first distance from the temperature detection element in a lateral direction of the substrate orthogonal to a longitudinal direction of the substrate, and the second heating element has a second distance that is greater than the first distance from the temperature detection element in the lateral direction. As viewed in a thickness direction of the substrate orthogonal to the lateral direction and the longitudinal direction of the substrate, the conductor overlaps the first heating element and the second heating element.

15 Claims, 18 Drawing Sheets

(58) Field of Classification Search
CPC ........ H05B 2203/003; H05B 2203/007; H05B 2203/013; H05B 2203/017
See application file for complete search history.

(56) References Cited

U.S. PATENT DOCUMENTS

| | | | | |
|---|---|---|---|---|
| 2020/0183307 A1* | 6/2020 | Furuichi | ............ | G03G 15/2053 |
| 2021/0191294 A1* | 6/2021 | Nishida | ............. | G03G 15/2039 |
| 2021/0255569 A1* | 8/2021 | Uekawa | ............. | G03G 15/2042 |
| 2022/0397847 A1* | 12/2022 | Fujiwara | ............ | G03G 15/2053 |

FOREIGN PATENT DOCUMENTS

| | | | |
|---|---|---|---|
| JP | 2015-035413 | A | 2/2015 |
| JP | 2015-219343 | A | 12/2015 |

* cited by examiner

FIG. 8

| | FIXING DEVICE ACCORDING TO PRESENT EMBODIMENT | | FIXING DEVICE ACCORDING TO COMPARATIVE EXAMPLE | |
|---|---|---|---|---|
| | HEATING ELEMENT 232a 232b | HEATING ELEMENT 232c 232d | HEATING ELEMENT 232a 232b | HEATING ELEMENT 232c 232d |
| ΔTth1 | 5°C | 5°C | 5°C | 8°C |
| ΔTth2 | 2°C | 2°C | 2°C | 5°C |

HEATER, HEATING DEVICE, AND IMAGE FORMING APPARATUS

BACKGROUND

Field

The present disclosure relates to a heater and, in particular, to a heater used in a copying machine, a printer, a facsimile, and the like using an electrophotographic process or an electrostatic recording process.

Description of the Related Art

In existing image forming apparatuses using an electrophotographic process, such as Japanese Patent Laid-Open No. 2000-162909, an unfixed toner image formed on a sheet is fixed by being heated and pressurized by a fixing device including a heater.

Sheets to which a fixing device can fix a toner image have various widths, such as the widths of an A4, B5, and A5 paper. When a toner image is fixed onto an A4 size sheet, the difference is small between the width of a heated area, which is an area heated by the heater, and the width of the sheet is small in the longitudinal direction of the heater, so that the temperature of a non-sheet passing area through which the sheet does not pass is less likely to increase. In contrast, when a toner image is fixed onto an A5 size sheet having a smaller width than an A4 size sheet, the difference is large between the width of the heated area and the width of the sheet in the longitudinal direction of the heater, so that the temperature in a non-sheet passing area is likely to increase. If the temperature of the non-sheet passing area increases, an image defect may occur.

Some conventional image forming apparatuses include a heater includes a plurality of heating elements having different lengths in the longitudinal direction of the heater and switches between the heating elements to be used according to the width of a sheet.

In some cases, a plurality of heating elements having different lengths in the longitudinal direction of the heater are disposed side by side in the lateral direction of the heater. In such a heater, if there is a difference in the distance between a thermistor and a heating element in the lateral direction of the heater, the temperature response of the thermistor may vary from heating element to heating element that generates heat.

SUMMARY

According to an aspect of the present disclosure, a heater includes a substrate having an elongated shape, a first heating element and a second heating element disposed on a first surface of the substrate, a temperature detection element disposed on a second surface of the substrate opposite the first surface of the substrate, and a conductor disposed on the second surface and connected to the temperature detection element, wherein the first heating element has a first distance from the temperature detection element in a lateral direction of the substrate orthogonal to a longitudinal direction of the substrate, and the second heating element has a second distance that is greater than the first distance from the temperature detection element in the lateral direction, and wherein, as viewed in a thickness direction of the substrate orthogonal to the lateral direction and the longitudinal direction of the substrate, the conductor overlaps the first heating element and the second heating element.

Further features of the present disclosure will become apparent from the following description of exemplary embodiments with reference to the attached drawings.

BRIEF DESCRIPTION OF THE DRAWINGS

FIG. 8 is a table listing the temperatures of temperature detection elements.

DESCRIPTION OF THE EMBODIMENTS

Embodiments of the present disclosure are described below with reference to the accompanying drawings. It should be noted that the following embodiments are in no way intended to limit the disclosure defined by the appended claims. All of the features and the combinations thereof described in the embodiments are not necessarily essential to the disclosure.

First Embodiment

Image Forming Apparatus

Figure 1:
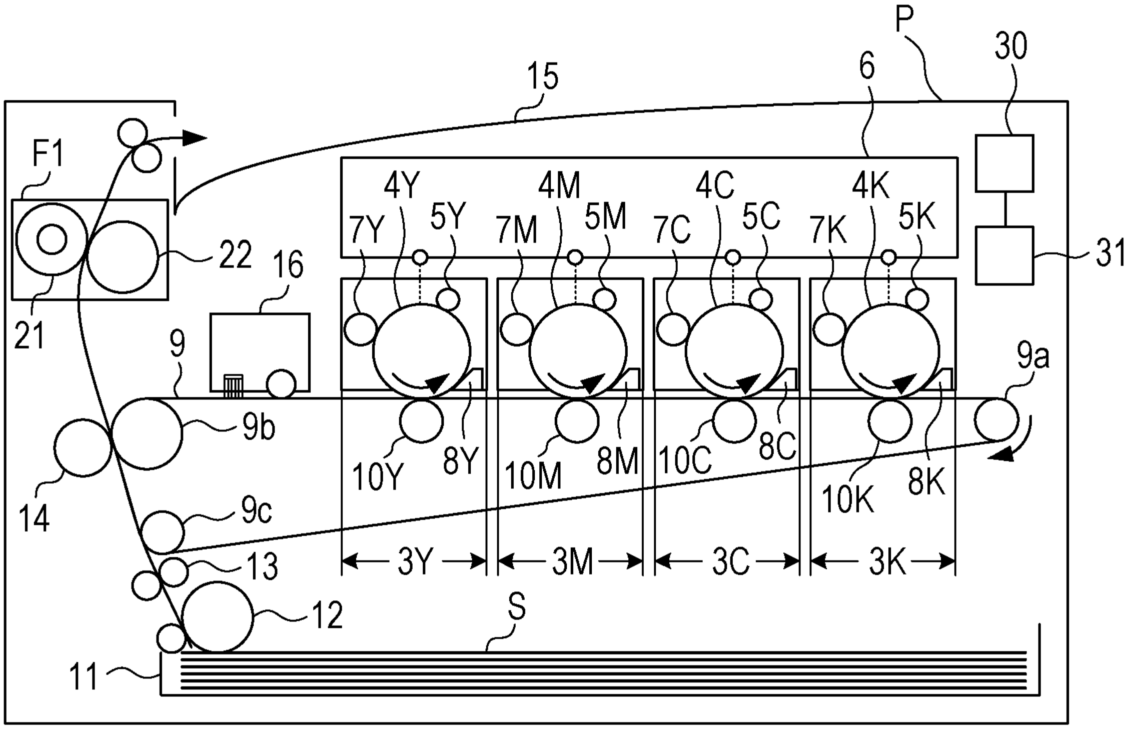
FIG. 1 is a schematic configuration diagram of an image forming apparatus.

FIG. 1 is a configuration diagram schematically illustrating an image forming apparatus P. The image forming apparatus P includes four image forming stations 3Y, 3M, 3C, and 3K that form yellow, magenta, cyan, and black images, respectively.

The four image forming stations 3Y, 3M, 3C, and 3K are arranged in line at equal intervals. In the following description, the letter Y, M, C, or K at the end of the reference symbols indicates that the member is related to formation of a toner image of corresponding colors (yellow (Y), magenta (M), cyan (C) and black (K)). When it is not necessary to distinguish colors in the following description, a reference symbol not having the last letter Y, M, C or K may be used.

Each of the image forming station 3 includes a photosensitive drum 4 serving as an image bearing member and a charging roller 5 serving as a charging unit. Furthermore, the image forming station 3 includes an exposure device 6 serving as an exposure unit, a developing device 7 serving as a developing unit, and a cleaning device 8 as a cleaning unit.

A video controller 30 performs, for example, conversion of a character code to a bit map and half-toning processing by, for example, dithering halftone images on the basis of the information received from an external apparatus, such as a host computer, (not illustrated). Thereafter, the video controller 30 transmits a print signal and image information to an engine control unit 31. Upon receiving the image information from the video controller 30, the engine control unit 31 forms an image in accordance with the image information.

The outer peripheral surface (the front surface) of the photosensitive drum 4, which is rotated in the direction of the arrow, is uniformly charged by the charging roller 5. When the charged photosensitive drum 4 is irradiated with a laser beam in accordance with the image information by the exposure apparatus 6, an electrostatic latent image is formed on the photosensitive drum 4. The developing device 7 develops the electrostatic latent image with toner and forms a toner image (hereinafter, also simply referred to as an "image").

A continuous intermediate transfer belt 9 provided in the direction in which the image forming stations 3 are arranged is stretched taut around a drive roller 9*a*, a driven roller 9*b*, and a driven roller 9*c*.

The drive roller 9*a* rotates in the direction of the arrow. As a result, the intermediate transfer belt 9 is rotationally moved along the image forming stations 3 at a speed of 100 mm/sec.

A toner image formed in each of the image forming stations 3 is sequentially primary-transferred onto the intermediate transfer belt 9 by a primary transfer roller 10 having a primary transfer bias applied thereto. The residual transfer toner remaining on the photosensitive drum 4 after the primary transfer is removed by a cleaning blade (not illustrated) provided in the cleaning device 8.

A sheet S, which is, for example, a paper sheet, is stacked in a sheet supplying cassette 11 and is fed by a feed roller 12. The fed sheet S is conveyed to a registration roller pair 13. The registration roller pair 13 conveys the sheet S to the secondary transfer nip portion between the intermediate transfer belt 9 and a secondary transfer roller 14.

The secondary transfer roller 14 is disposed so as to face the driven roller 9*b* with the intermediate transfer belt 9 therebetween. By applying the secondary transfer bias to the secondary transfer roller 14, the image on the intermediate transfer belt 9 is secondarily transferred to the sheet S passing through the secondary transfer nip portion. The residual transfer toner remaining on the surface of the intermediate transfer belt 9 after the secondary transfer is removed by an intermediate transfer belt cleaning device 16.

The sheet S having the image secondarily transferred thereon is heated, pressurized, and fixed by a fixing device F1 serving as a heating device. The configuration of the fixing device F1 is described in detail below. The sheet S having the image fixed thereto is output to an output tray 15.

Fixing Device

Figure 2:
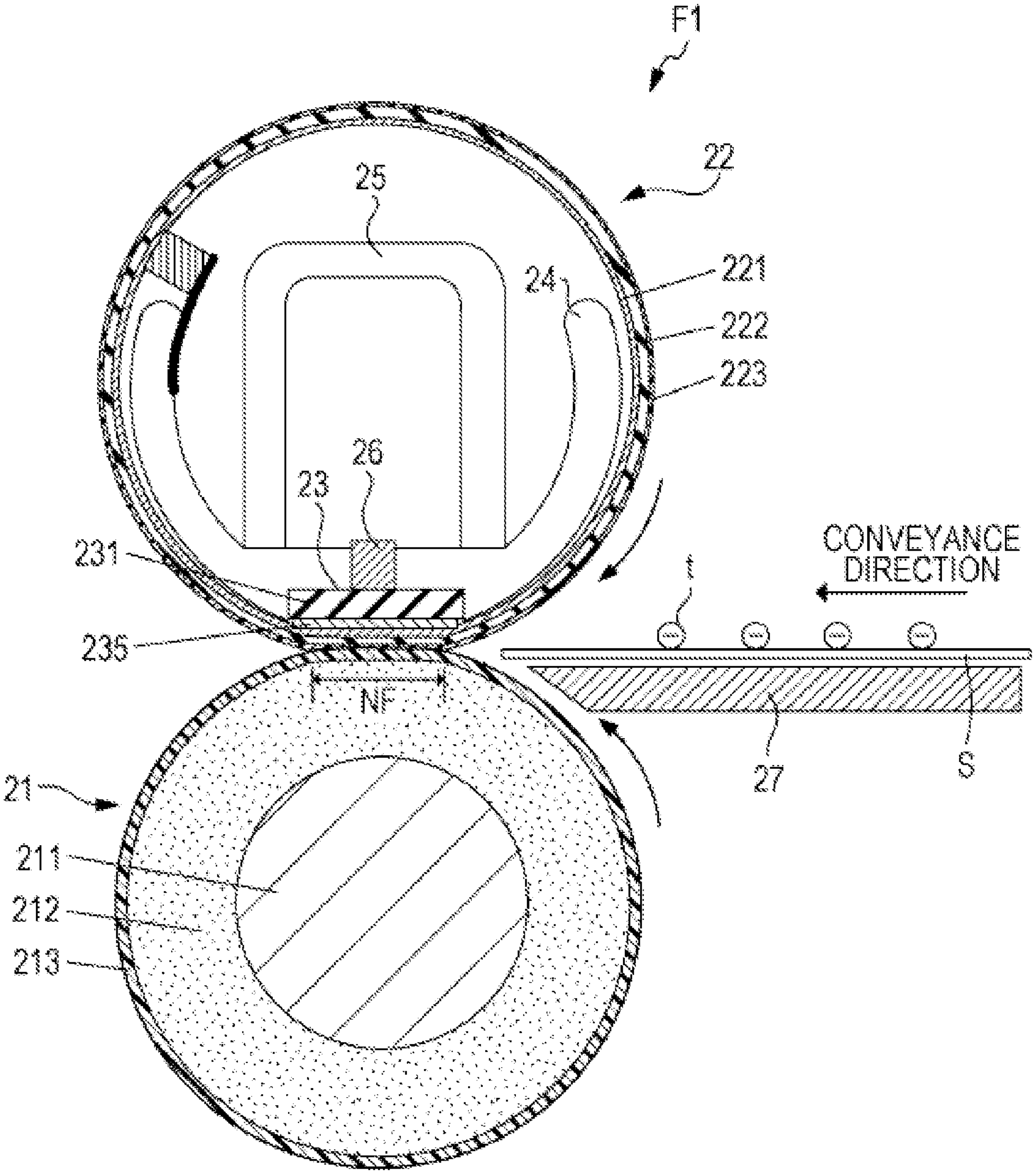
FIG. 2 is a cross-sectional view of a fixing device.

FIG. 2 is a cross-sectional view of the fixing device F1. The fixing device F1 includes a fixing film 22 and a pressure roller 21. The fixing film 22 and the pressure roller 21 form a nip portion. The fixing device F1 rotationally drives the pressure roller 21 to drive the fixing film 22 by the conveyance force of the pressure roller 21. That is, the fixing device F1 is a device of a tensionless type using a film heating method and a pressure roller drive method. The fixing device F1 further includes a heater 23, a heater holder 24, a rigid stay 25, and the like. The configuration of the heater 23 is described below with reference to FIGS. 3A and 3B and the like. Note that the direction of the long side of the elongated heater 23 is also referred to as a "longitudinal direction" (the right-left direction in FIGS. 3A and 3B), and the direction of the short side of the heater 23 orthogonal to the longitudinal direction is also referred to as a "lateral direction" (the up-down direction in FIGS. 3A and 3B). The direction of the thickness of the heater 23 orthogonal to the longitudinal direction and the lateral direction is also referred to as a "thickness direction" (the up-down direction in FIG. 4).

The fixing film 22 is formed of a flexible heat-resistant resin material in a cylindrical shape. The outer peripheral length of the fixing film 22 is 57 mm. The fixing film 22 has a polyimide layer having a thickness of 50 microns as a cylindrical base layer 221 and an elastic layer 222 formed of silicone rubber having a thickness of 200 microns on the outer periphery of the base layer 221. Furthermore, the fixing film 22 has a release layer 223 formed of a fluororesin having a thickness of 15 microns on the outer periphery of the elastic layer 222.

The inner peripheral length of the fixing film 22 is greater than the outer peripheral length of the heater holder 24 that holds the heater 23 by 3 mm, and the fixing film 22 is loosely fitted to the outer periphery of the heater holder 24 with a margin of the peripheral length. The heater 23 is disposed in the internal space of the fixing film 22 while being held by the heater holder. The rigid stay 25 is a rigid member having a downward U shape in cross section. The rigid stay 25 is disposed at the center of the upper surface of the heater holder 24 in the lateral direction.

The pressure roller 21 includes a round shaft-shaped core metal 211, an elastic layer 212 made of silicone rubber and formed on the outer periphery of the core metal 211 in a concentric manner with the core metal 211, and a release layer 213 formed of a conductive fluororesin around the elastic layer 212. The outer peripheral length of the pressure roller 21 is 63 mm. Note that the elastic layer 212 may be formed by foaming heat-resistant rubber, such as fluororubber, or silicone rubber. The release layer 213 may be made of an insulating fluororesin.

The pressure roller 21 is disposed parallel with the fixing film 22 below the fixing film 22. In the pressure roller 21, both ends of the core metal 211 in the longitudinal direction are rotatably held via the bearing members. The core metal 211 of the pressure roller 21 and the rigid stay 25 are pressed by a pressure spring (not illustrated) at both ends in the longitudinal direction so that the outer peripheral surface of the pressure roller 21 and the outer peripheral surface of the fixing film 22 are in contact with each other. By bringing the pressure roller 21 and the fixing film 22 into contact with each other by the pressure of the pressure spring, a nip portion NF is formed between the pressure roller 21 and the fixing film 22. The sheet S is conveyed by the nip portion NF. Note that the total pressure applied to the pressure roller 21 and the rigid stay 25 is 20 kgf (kilogram-force).

The engine control unit 31 rotates the pressure roller 21 in the direction of the arrow at a predetermined peripheral speed (a process speed) in response to a print command. At this time, a rotational force acts on the fixing film 22 due to the frictional force between the surface of the pressure roller 21 and the surface of the fixing film 22 in the nip portion NF. Due to the rotational force of the fixing film 22, the inner peripheral surface of the fixing film 22 slides in tight contact with the heater 23 and is drivenly rotated on the outer periphery of the heater holder 24 in the direction of the arrow. The rotation of the fixing film 22 is guided by the outer peripheral surface of the heater holder 24 formed along the inner peripheral shape of the fixing film 22. As a result, the rotation of the fixing film 22 is stable, and the fixing film 22 rotates while moving along the same rotational trajectory.

The engine control unit 31 energizes the heating element of the heater 23 in response to the print command. When energized and supplied with electric power, the heater 23 raises the temperature thereof and heats the fixing film 22. The heater 23 is described in more detail below.

When the rotation of the pressure roller 21 and the fixing film 22 is stable and the temperature of the heater 23 reaches a target temperature, the sheet S having an unfixed image t thereon is conveyed to the nip portion NF through an entry guide 27. The sheet S is pinched and conveyed by the pressure roller 21 and the fixing film 22 at the nip portion NF. Heat and pressure are applied to the sheet S at the nip portion NF, and the unfixed image t is fixed to the sheet S. The sheet S having the image t fixed thereto is separated from the surface of the fixing film 22 by self-stripping and is output from the nip portion NF.

Heater

Figure 3A:
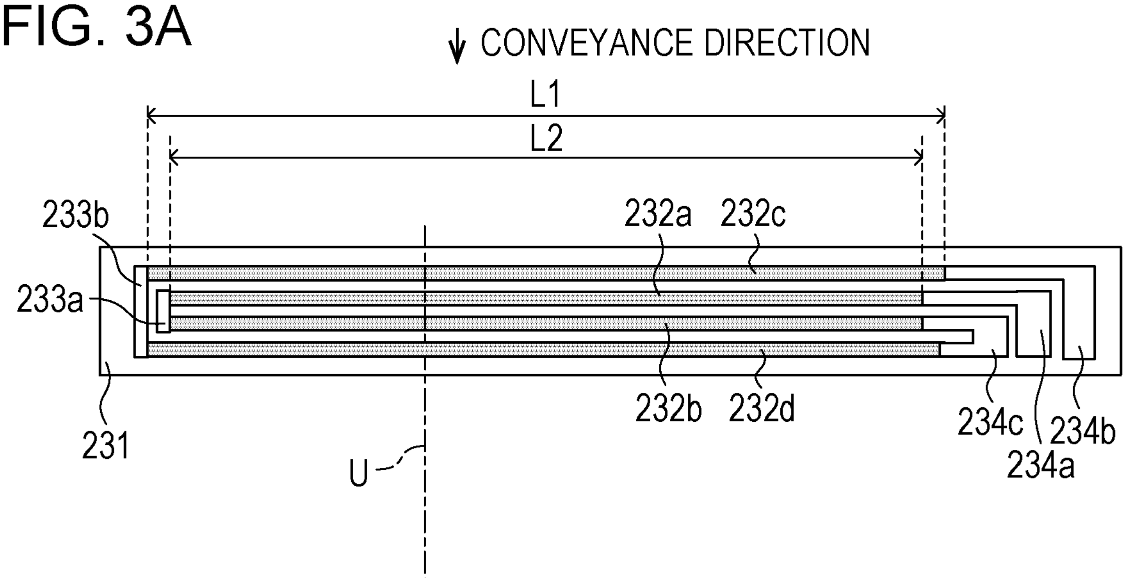
FIGS. 3A and 3B are schematic illustrations of a heater in the longitudinal direction.
Figure 3B:
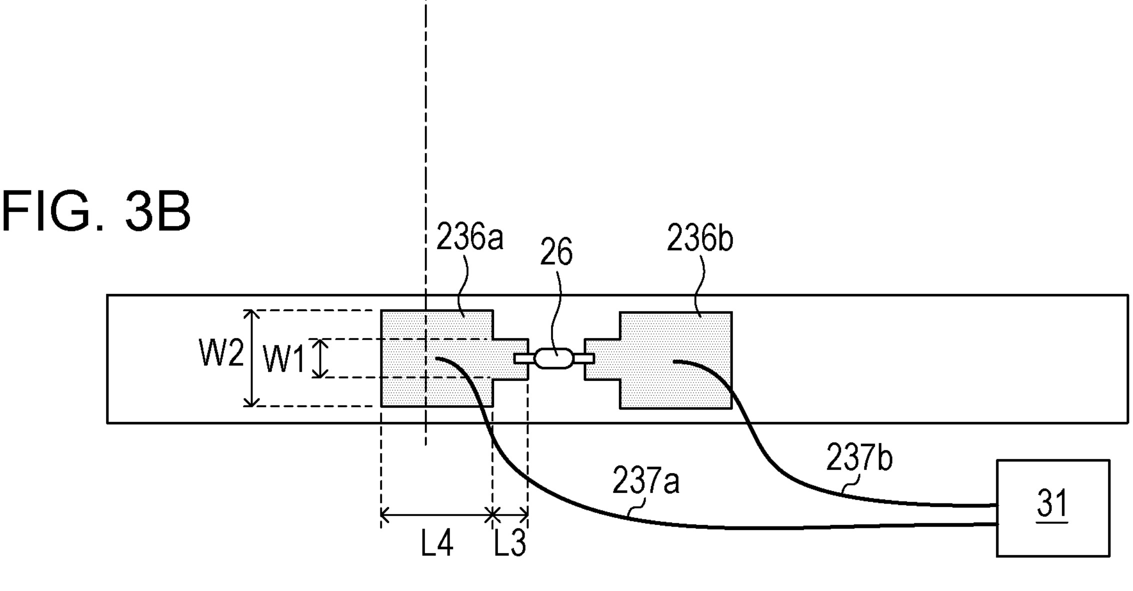
Figure 4:
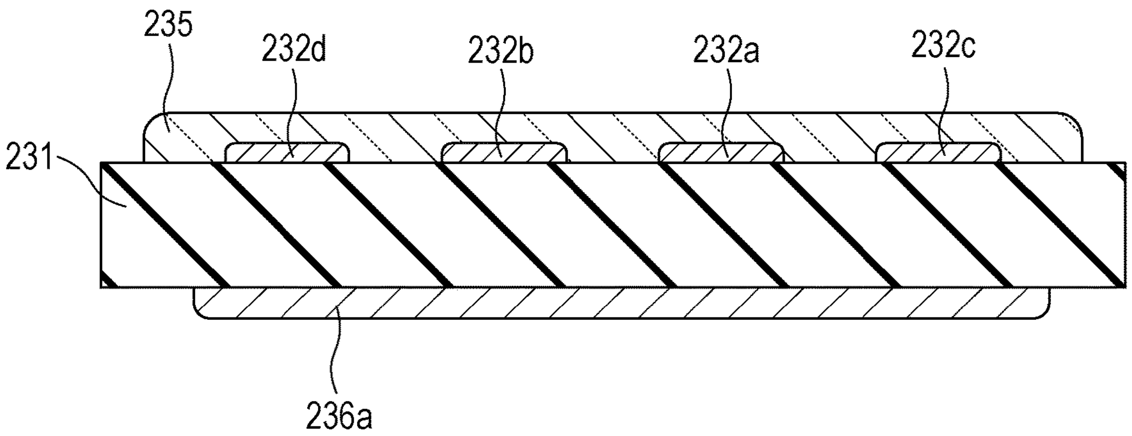
FIG. 4 is a cross-sectional view of the heater.

The configuration of the heater 23 is described below with reference to FIGS. 3A and 3B and FIG. 4. FIGS. 3A and 3B are schematic illustrations of the heater 23 in the longitudinal direction. FIG. 3A illustrates the first surface side (also referred to as a front surface side) of a substrate having the heating elements disposed thereon, and FIG. 3B illustrates the second surface side (also referred to as the back surface side) of the substrate. FIG. 4 is a schematic cross-sectional view of the heater 23 taken along line U of FIGS. 3A and 3B.

The heater 23 includes a ceramic substrate 231 that is elongated in the longitudinal direction and that has heat resistance, electric insulation, and high thermal conductivity. The heater 23 further includes heating elements 232*a*, 232*b*, 232*c*, and 232*d* made of a conductive material whose main components are silver and palladium. Still furthermore, the heater 23 includes conductors 233*a* and 233*b*, contacts 234*a*, 234*b*, and 234*c*, whose main component is silver, and a heat-resistant surface protective layer 235 made of glass or the like.

The heating elements 232*a*, 232*b*, 232*c*, and 232*d*, the conductors 233*a* and 233*b*, and the contacts 234*a*, 234*b*, and 234*c* are formed on a surface of the substrate 231, over which the surface protective layer 235 is further formed to insulate the heating elements 232*a*, 234*b*, 234*c*, and 232*d* and the conductors 233*a* and 233*b* from the fixing film 22. In this example, the length of the substrate 231 in the longitudinal direction is 250 mm, the length in the lateral direction is 7 mm, and the thickness is 1 mm. The heating elements 232*a*, 232*b*, 232*c*, and 232*d* and the conductors 233*a* and 233*b* have a thickness of 10 μm, the contacts 234*a*, 234*b*, and 234*c* have a thickness of 20 μm, and the surface protective layer 235 has a thickness of 50 μm.

The heating elements 232*c* and 232*d* are connected in series via the conductor 233*b*. The heating elements 232*a* and 232*b* are connected in series via the conductor 233*a*. The heating elements 232*c* and 232*d* and the heating elements 232*a* and 232*b* have different lengths in the longitudinal direction. More specifically, the length of the heating elements 232*c* and 232*d* in the longitudinal direction is L1, and the length of the heating elements 232*a* and 232*b* in the longitudinal direction is L2. The length L1 and the length L2 have a relationship of L1>L2. In this example, the length L1=222 mm, and the length L2=216 mm.

The heating elements 232*a* and 232*b* are disposed so as to be line-symmetrical about the center of the substrate 231 in the lateral direction. In addition, the heating elements 232*c* and 232*d* are disposed so as to be line-symmetrical about the center of the substrate 231 in the lateral direction. The heating elements 232*c* and 232*d* are disposed on the outer side of the heating elements 232*a* and 232*b* in the lateral direction of the substrate 231, respectively. In this example, the width of each of the heating elements 232*a*, 232*b*, 232*c*, and 232*d* is 0.7 mm. Furthermore, for an insulation purpose, the heating elements are disposed at predetermined intervals or more. In this example, the distance between the heating elements is 0.6 mm. That is, the heating elements 232*a* and 232*b* are disposed in a region between two points located at distances of 0.3 mm and 1.0 mm from the center in the lateral direction of the substrate 231. In addition, the heating elements 232*c* and 232*d* are disposed in a region between two points located at distances of 1.6 mm and 2.3 mm from the center in the lateral direction of the substrate 231.

In this example, the total resistance value of the heating elements 232*a* and 232*b* is 18Ω. The total resistance value of the heating elements 232*a* and 232*b* is 20Ω. The heating elements 232*a* and 232*b* are electrically connected to the contacts 234*a* and 234*c* via the conductor 233*a*. The heating elements 232*c* and 232*d* are electrically connected to the contacts 234*b* and 234*c* via the conductor 233*b*. The contact 234*c* is a contact that is commonly connected to each of the heating elements.

The length L1 of the heating elements 232*c* and 232*d* is a toner image fixable length for the sheet S having the largest width (hereinafter, also referred to as the largest paper passing width) among various types of sheets S printable (or conveyable) by the image forming apparatus. In this example, one of a set of the heating elements 232*a* and 232*b* and a set of the heating elements 232*c* and 232*d* exclusively generate heat in accordance with the width of the sheet S to be printed. For example, the heating elements 232*c* and 232*d* are used when a LTR size sheet S having a width of 216 mm is subjected to a fixing process, and the heating elements 232*a* and 232*b* are used when an A4 size sheet S having a width of 210 mm is subjected to a fixing process.

For example, a temperature detection element 26, which is a thermistor, is disposed on a surface of the substrate 231 opposite the surface having the heating element 232 thereon. The temperature detection element 26 is located at the substantial center of the heating elements 232*a*, 232*b*, 232*c*, and 232*d* in the longitudinal direction and the lateral direction of the substrate 231. The temperature detection element 26 is bonded to the substrate 231.

Furthermore, a conductor 236*a* and a conductor 236*b* each having electrical conductivity are formed on the same surface as the surface having the temperature detection element 26 thereon. The temperature detection element 26 is in physical contact with the conductor 236*a* and the conductor 236*b* and is in electrical contact with the conductor 236*a* and the conductor 236*b*. A conductive wire 237*a* and a conductive wire 237*b* are electrically connected to the conductors 236*a* and 236*b*, respectively, by welding or the like and are connected to the engine control unit 31. The temperature detection element 26 outputs the temperature detection result to the engine control unit 31 via the conductor 236*a* and the conductor 236*b*. The engine control unit 31 controls energization of the heating elements on the basis of the temperature detected by the temperature detection element 26 so that the temperature of the heater 23 is a target temperature T.

Figure 5:
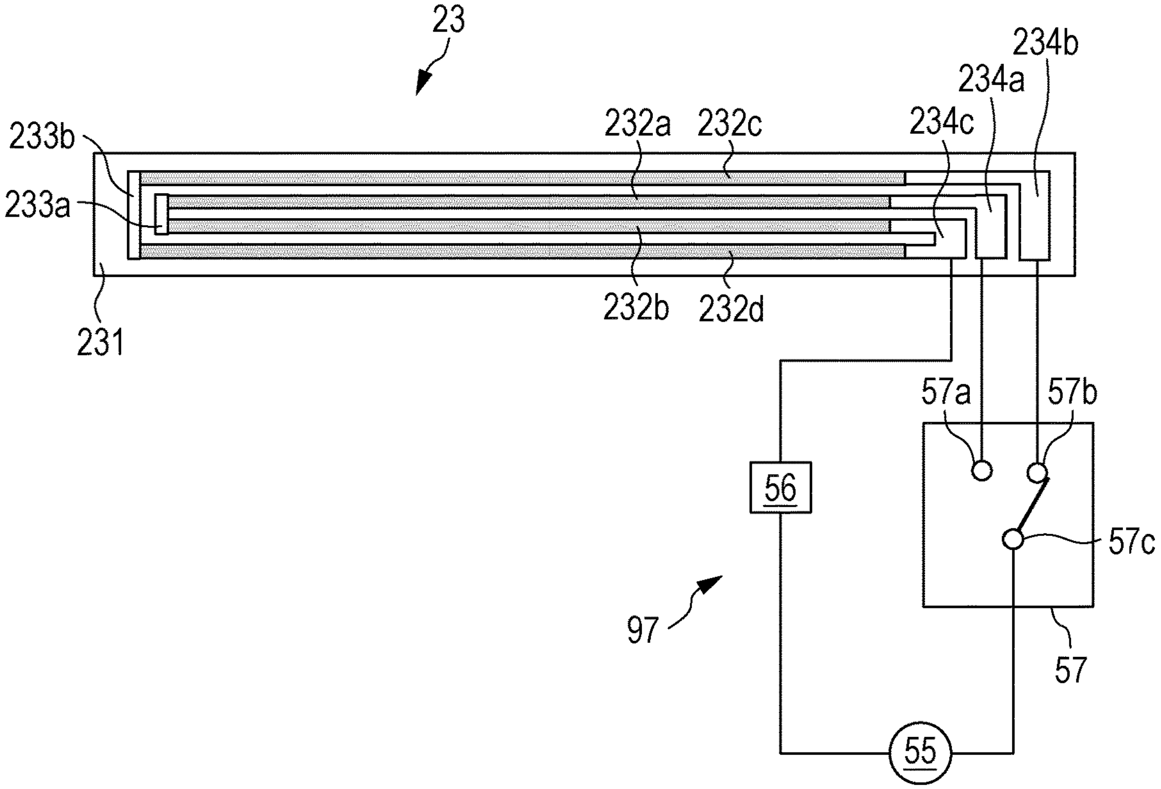
FIG. 5 is a schematic illustration of a power control unit.

FIG. 5 is a schematic illustration of a power control unit 97, which is a control circuit of the fixing device F1. The electric power control unit 97 includes a bidirectional thyristor 56 (hereinafter, also referred to as a triac), a switch 57 that exclusively selects a heating element to which the power is to be supplied, and the like. In this example, the switch 57 is a C contact relay. The power control unit 97 selects the heating element 232 to which the power is to be supplied and determines the amount of power to be supplied.

The triac 56 is turned on and enters a conductive state when power is supplied from the AC power supply 55 to a set of the heating elements 232*a* and 232*b* or a set of the heating elements 232*c* and 232*d*. In contrast, the triac 56 is turned off and enters a nonconductive state when power is not supplied to a set of the heating elements 232*a* and 232*b* or a set of the heating elements 232*c* and 232*d*. The engine control unit 31 calculates the electric power required to control the target temperature (for example, at 180° C. described above) on the basis of the temperature detected by the temperature detection element 26 and controls the triac 56 to be in a conductive or nonconductive state.

The switch 57 has a contact 57*c* connected to the AC power supply 55, a contact 57*a* connected to the contact 234*a*, and a contact 57*b* connected to the contact 234*b*. The switch 57 is in either a state in which the contact 57*c* and the contact 57*a* are connected or a state in which the contact 57*c* and the contact 57*b* are connected. By switching a contact to another contact by using the switch 57, the state of supplying electric power to the heating elements 232*a* and 232*b* and the state of supplying electric power to the heating elements 232*c* and 232*d* can be exclusively switched between. The switch 57 receives a signal from the engine control unit 31 and performs the switching operation. To prevent contact welding of the switch 57, which is a C contact relay, the triac 56 is set in a nonconductive state when switching is performed.

Electric power is applied to the heating elements 232*a* and 232*b* at the same time to generate heat. In addition, electric power is applied to the heating elements 232*c* and 232*d* at the same time. In this way, two heating elements that generates heat at the same time are disposed so as to be line-symmetrical about the center of the substrate 231 in the lateral direction. By arranging the two heating elements so as to be line-symmetrical about the center of the substrate 231 in the lateral direction, the thermal expansions that occur when the heating elements generate heat are also symmetrical, and the substrate 231 is less likely to crack.

The heating elements 232*c* and 232*d* are disposed closer to the ends of the substrate 231 in the lateral direction of the substrate 231 than the heating elements 232*a* and 232*b*. The distances of the heating elements 232*c* and 232*d* from the temperature detection element 26 in the lateral direction of the substrate 231 are greater than those of the heating elements 232*a* and 232*b*. The heating element 232 which has a longer distance from the temperature detection element 26 takes longer time to transfer the heat generated by the heating element 232 to the temperature detection element 26. That is, it takes a long time for the temperature detection element 26 to detect a temperature change caused by the heat generated by the heating element 232, which means that the temperature response of the temperature detection element 26 varies depending on which heating element 232 generates heat. As a result, the time until the temperature of the heater 23 reaches a desired temperature also varies, and if the distance is long, the temperature of the heater 23 is slow to follow. Furthermore, if the distances between the heating element 232 and the temperature detection element 26 differ from each other, the heat transfer to the temperature detection element 26 changes depending on the heating element 232. Even if the temperature of the temperature detection element 26 is the same, the temperature of the heater 23 may change depending on the heating element 232 that is used.

For this reason, the temperature detection element 26 and the heating element 232 in the heater 23 are disposed in the following manner. That is, as viewed in the thickness direction of the substrate 231, the conductors and the heating elements are disposed such that the conductors 236*a* and 236*b* connected to the temperature detection element 26 overlap the heating elements 232*a*, 232*b*, 232*c*, and 232*d*. The overlapping region may be part of the conductors 236*a* and 236*b*, but it is desirable that the area of the overlapping region be maximized. As an example, in FIGS. 3A and 3B and FIG. 4, a width W1 of each of the conductors 236*a* and 236*b*=2.0 mm in the lateral direction of the substrate 231, and a width W2=5.0 mm. In addition, a length L3 of each of the conductors 236*a* and 236*b*=2.0 mm in the longitudinal direction of the substrate 231, and a length L4=6.0 mm.

The conductor 236*a* and the conductor 236*b* are formed of a material having electrical conductivity and high thermal conductivity. In this example, the material is a metal paste, such as silver or copper paste, and the conductor 236*a* and the conductor 236*b* are formed on the substrate 231 by screen printing or the like so as to have a thickness of 20 μm. Alternatively, a paste containing a material of high thermal conductivity, such as graphite, carbon, or ceramic, may be formed on the substrate 231.

Still alternatively, a paste may be formed in a sheet shape and be bonded to or in contact with the substrate 231. Note that the paste may have any structure if the paste is a thin film or a sheet member that has electrical conductivity so as to function as an electric circuit after being in tight contact with the substrate 231 and being electrically connected to the temperature detection element 26 and that has a high thermal conductivity equal to or higher than that of the substrate 231.

The conductors 236*a* and 236*b* are in physical contact with the temperature detection element 26 and are electrically connected to the temperature detection element 26. The conductors 236*a* and 236*b* can transfer electricity to the temperature detection element 26 and can also transfer heat to the temperature detection element 26. The conductors 236*a* and 236*b* are one or more electric circuits that electrically transmit information about the temperature detected by the temperature detection element 26 to the engine control unit 31 and also function as a heat collecting member for the temperature detection element 26.

The heat generated by the heating element 232 is transferred to the conductors 236*a* and 236*b* via the substrate 231 and is transferred to the temperature detection element 26 via the conductors 236*a* and 236*b*. As a result, the delay can be reduced when the heat generated by the heating element is transferred to the temperature detection element 26 in the form of a predetermined temperature change and, thus, the delay of control of power distribution to the heating element 232 can be reduced.

As viewed in the thickness direction of the substrate 231, the conductors 236*a* and 236*b* are disposed so as to overlap all of the heating elements 232*a*, 232*b*, 232*c* and 232*d*. As a result, heat can be transferred to the temperature detection element 26 via the conductors 236*a* and 236*b* in both cases where the heating elements 232*a* and 232*b* generate heat and the heating elements 232*c* and 232*d* generate heat. The heating elements 232*a* and 232*b* and the heating elements 232*c* and 232*d* have different distances from the temperature detection element 26 in the lateral direction of the substrate 231. Even when the heating elements 232*a* and 232*b* are heated or even when the heating elements 232*c* and 232*d* are heated, the heat transfer effect of the conductors 236*a* and 236*b* can reduce variation in the temperature response of the temperature detection element 26. The heat generated by the heating element 232 that has a long distance from the temperature detection element 26 may be delayed in transmission or may be diffused by peripheral members. As a result, the temperature detection element 26 may detect a relatively low temperature. The electric power supplied to the heating element 232 is controlled on the basis of the temperature detected by the temperature detection element 26. Therefore, if the temperature response of the temperature detection element 26 varies depending on the heating element 232 that is used, overshoot in which the temperature of the heater 23 significantly exceeds the target temperature, undershoot in which the temperature drops below the target temperature, or the ups and downs (ripple) of the temperature may occur. By arranging the conductors 236*a* and 236*b* in a manner illustrated in FIGS. 3A and 3B and FIG. 4, the occurrence of such phenomena can be prevented.

Experiment 1

An experiment was conducted to confirm the effect using the fixing device F1 according to the above-described embodiment. The process speed of the image forming apparatus used in the experiment was 100 mm/s, and the distance between the preceding sheet S and the succeeding sheet S (paper spacing) was 30 mm. In the experiment, a sheet S having a basis weight of 80 $g/m^2$ and a LTR size (width 216 mm, length 279 mm) and a sheet S having an A4 size (width 210 mm, length 297 mm) were used.

When a LTR size sheet S was subjected to a fixing process, the engine control unit 31 controlled the switch 57 and performed the fixing process using the heating elements 232*c* and 232*d*. When the A4 size sheet S was subjected to the fixing process, the engine control unit 31 controlled the switch 57 and performed the fixing process using the heating elements 232*a* and 232*b*.

The experiment was conducted by installing an image forming apparatus in an environment with an environment temperature of 23° C. and a humidity of 50%. Printing was performed using an image forming apparatus including the fixing device F1 according to the present embodiment and an image forming apparatus including a fixing device according to a comparative example. In the heater 23 of the fixing device F1 according to the present embodiment, the conductors 236*a* and 236*b* and the heating elements 232*a*, 232*b*, 232*c* and 232*d* were disposed so as to overlap each other as viewed in the thickness direction of the substrate 231, as described above. The conductors 236*a* and 236*b* had a width W1=2.0 mm and a width W2=5.0 mm. Furthermore, the length L3=2.0 mm, and the length L4=6.0 mm.

Figure 6A:
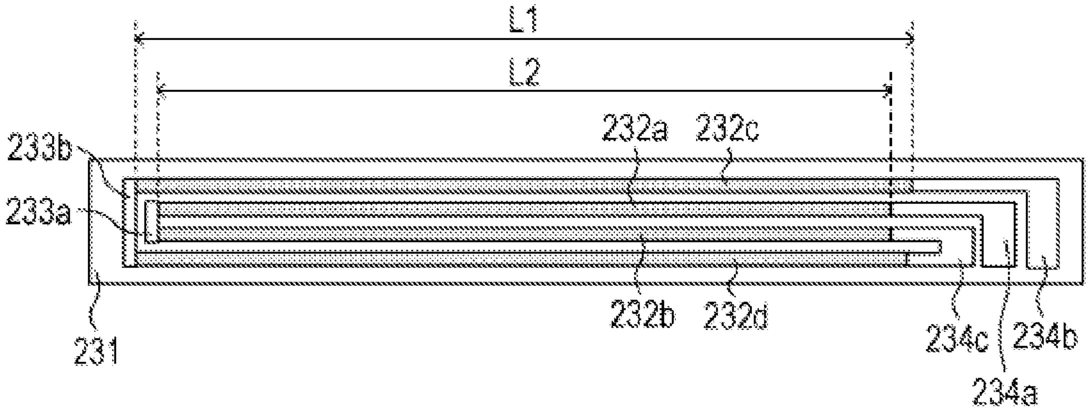
FIG. 6A RELATED ART
FIGS. 6A and 6B are schematic illustrations of a heater in the longitudinal direction according to a comparative example.
Figure 6B:
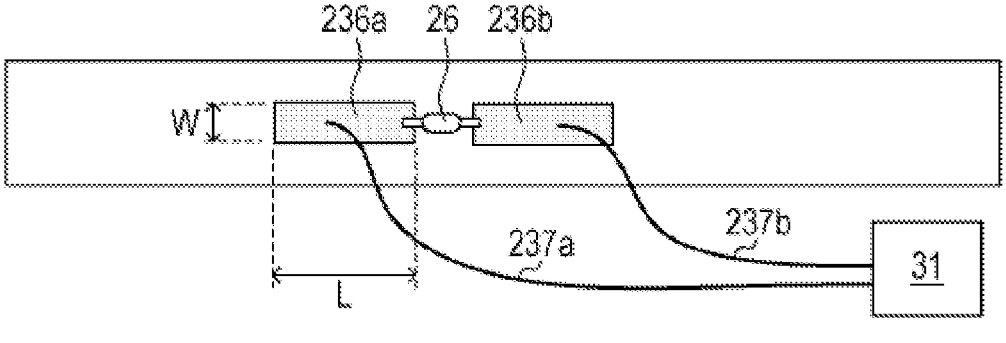
FIG. 6B RELATED ART

The fixing device according to the comparative example had a different shape of a conductor disposed in the heater 23 from that according to the present embodiment. FIGS. 6A and 6B are schematic illustrations of the heater 23 in the longitudinal direction, according to the comparative example. The heating element 232 of the heater 23, the engine control unit 31, and the like were the same as those according to the present embodiment. According to the comparative example, the shapes of the conductors 236*a* and 236*b* disposed on the back side of the heating element 232 were different from those of the present embodiment as viewed in the thickness direction of the substrate 231. The conductors 236*a* and 236*b* according to the comparative example had a width W of 2.0 mm and a length L=8.0 mm. The conductors 236*a* and 236*b* according to the comparative example had a shape that overlaps the heating elements 232*a* and 232*b* but did not overlap the heating elements 232*c* and 232*d* as viewed in the thickness direction of the substrate 231.

In the two image forming apparatuses each including one of the above-described fixing devices, the fixing devices were driven, and the heaters 23 were energized first in the state where the detection temperature of the temperature detection element 26 is 23° C. Subsequently, a start-up process was performed until the temperature detected by the temperature detection element 26 reached 180° C. (the target temperature) and, thereafter, the engine control unit 31 controlled the power distribution to the heater 23 so that the target temperature 180° C. was maintained.

The two fixing devices according to the present embodiment and the comparative example employed PID control for temperature control. The engine control unit 31 controlled power distribution to the heater 23 on the basis of the difference or the proportional relationship between the temperature detected by the temperature detection element 26 and the target temperature.

The temperature detected by the temperature detection element 26 was measured during the period from the beginning of the start-up process of the fixing device until the temperature detected by the temperature detection element 26 reached the target temperature to be maintained.

For each of the fixing devices according to the present embodiment and the comparative example, the temperature detected by the temperature detection element 26 was measured when the heating elements 232*a* and 232*b* generated heat and when the heating elements 232*c* and 232*d* generated heat.

Figure 7:
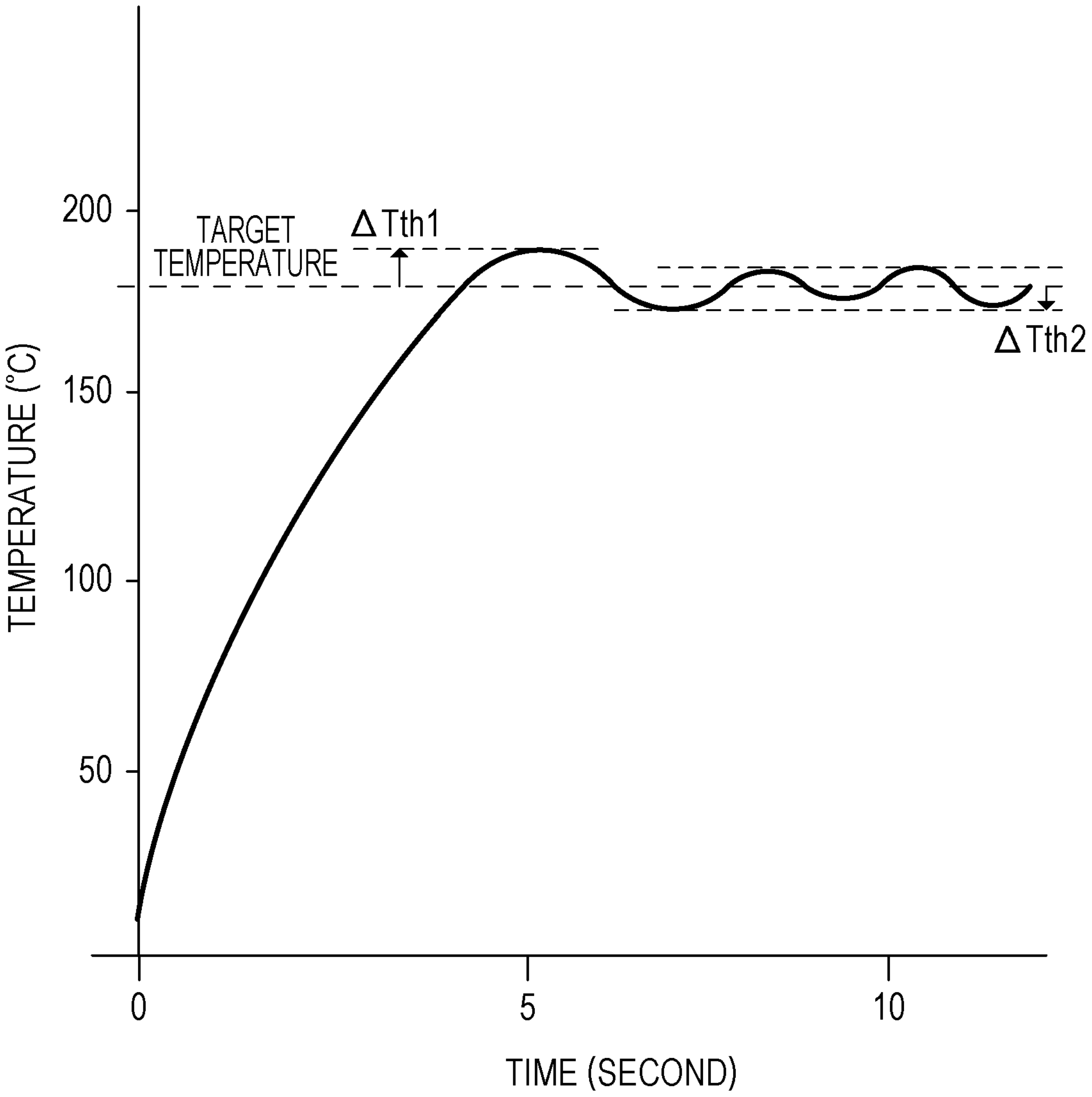
FIG. 7 is a graph denoting the change over time in the temperature of a temperature detection element.

FIG. 7 illustrates the change over time in the temperature detected by the temperature detection element 26 when the heating elements 232*a* and 232*b* generate heat in the fixing device according to the present embodiment. The abscissa represents the elapsed time from the beginning of power distribution to the heater 23, and the ordinate represents the temperature detected by the temperature detection element 26. The detected temperature rises to the target temperature 180° C. in about 5 seconds. After overshooting the target temperature, the detected temperature is controlled so as to maintain a value close to the target temperature 180° C. while slightly fluctuating above and below the target temperature (ripple of temperature). The temperature overshoot when the target temperature exceeds 180° C. at the time of rising is denoted as $\Delta Tth1$. In addition, in terms of the detected temperature after overshooting the target temperature and decreasing to the target temperature, the maximum value of the difference between the detected temperature and the target temperature is denoted as $\Delta Tth2$.

FIG. 8 is a table listing the temperatures detected by the temperature detection elements 26 of the fixing devices according to the present embodiment and the comparative example. In the fixing device according to the present embodiment, the values of ΔTth1 and ΔTth2 when the heating elements 232*a* and 232*b* generate heat do not differ from those when the heating elements 232*c* and 232*d* generate heat. At this time, ΔTth1=5° C., and ΔTth2=2° C. The relative relationship is such that the distance between the temperature detection element 26 and each of the heating elements 232*a* and 323*b* is less than the distance between the temperature detection element 26 and each of the heating elements 232*c* and 232*d* as viewed in the thickness direction of the substrate 231. Despite such a relationship, the values of ΔTth1 and ΔTth2 do not differ in the two cases. This is because each of the heating elements overlaps the conductors 236*a* and 236*b* in the thickness direction of the substrate 231. In the fixing device according to the comparative example, when the heating elements 232*a* and 232*b* generate heat, ΔTth1=5° C., and ΔTth2=2° C. When the heating elements 232*c* and 232*d* generate heat, ΔTth1=8° C., and ΔTth2=5° C.

As described above, according to the fixing device of the present embodiment, the overshoot and the temperature deviation are less than those according to the comparative example in each of the case where the heating elements 232*a* and 232*b* generate heat and the case where the heating elements 232*c* and 232*d* generate heat. In the fixing device according to the present embodiment, the difference in the amount of temperature overshoot between the case where the heating elements 232*a* and 232*b* generate heat and the case where the heating elements 232*c* and 232*d* generate heat is less than that according to the comparative example. According to the fixing device of the comparative example, when the heating elements 232*c* and 232*d* generate heat, the overshoot from the target temperature is large, and the deviation from the target temperature is also large. Furthermore, the difference in the amount of temperature overshoot and the like between the case where the heating elements 232*a* and 232*b* generate heat and the case where the heating elements 232*c* and 232*d* generate heat is large.

The reason is that in the fixing device according to the comparative example, the relative relationship is such that the distance between the temperature detection element 26 and each of the heating elements 232*a* and 323*b* is less than the distance between the temperature detection element 26 and each of the heating elements 232*c* and 232*d* in the lateral direction of the substrate 231. In addition, the conductors 236*a* and 236*b* are disposed so as not to overlap the heating elements 232*c* and 232*d* as viewed in the thickness direction of the substrate 231. As a result, when the temperature detected by the temperature detection element 26 reaches 180° C., which is the target temperature, and thereafter the heater 23 is turned on/off to maintain the target temperature, the temperature response is slow. Thus, the difference from the target temperature increases.

If the difference between the temperature of the heater 23 and the target temperature increases, the toner on the sheet S is overheated or underheated when the toner is heated and fixed. If the toner is overheated, the toner melts too much and the viscosity becomes too low, so that the toner adheres to the fixing film 22.

The toner that has adhered to the fixing film 22 is transferred to a sheet S after one revolution of the fixing film 22, resulting in an image defect. An image defect known as "hot offset" occurs. In contrast, if the toner is underheated, the toner cannot be sufficiently fixed to the sheet S, resulting in fixing failure.

Temperature overshoot and ripple can be improved to some extent by optimizing PID control if the temperature response of the temperature detection element 26 is constant with respect to the power distribution to the heating element 232. However, if the temperature response of the temperature detection element 26 varies depending on the heating element 232 used and if a heating element having a high temperature response and a heating element having a low temperature response coexist, it is difficult to remove the temperature overshoot and ripple by calibrating the control. If the control is performed in accordance with the heat generated by one heating element 232, the control of the other heating element 232 may overreact, or the control may be delayed.

According to the fixing device of the present embodiment, the heating elements 232*a*, 232*b*, 232*c*, 232*d* and the conductors 236*a* and 236*b* are disposed so as to overlap each other as viewed in the thickness direction of the substrate 231. As a result, no matter which heating element generates heat, the heat generated from the heating element 232 is transferred to the temperature detection element 26 connected to the conductors 236*a* and 236*b* via the conductors 236*a* and 236*b* having high heat conductivity. The heat generated by the heating element 232 can be efficiently transferred to the temperature detection element 26 as compared to the case where the conductors 236*a* and 236*b* do not overlap the heating element 232 as viewed in the thickness direction of the substrate 231.

Modification

While, as an example, the conductors 236*a* and 236*b* that overlap all the heating elements 232 have been described with reference to FIGS. 3A and 3B and FIG. 4, the configuration is not limited thereto. Any shape and material of the conductor 236 can be employed as long as the conductor 236 overlaps, among all the heating elements 232, the one having a relatively long distance from the temperature detection element 26 at least in the lateral direction of the substrate 231. The larger the area where the conductor 236 and the heating elements 232 overlap each other, the greater the effect. However, if even only part of the conductor 236 overlaps the heating element 232, the variation of the temperature response of the temperature detection element 26 can be reduced as compared to the case where the conductor 236 does not overlap the heating elements 232 at all.

Figure 9A:
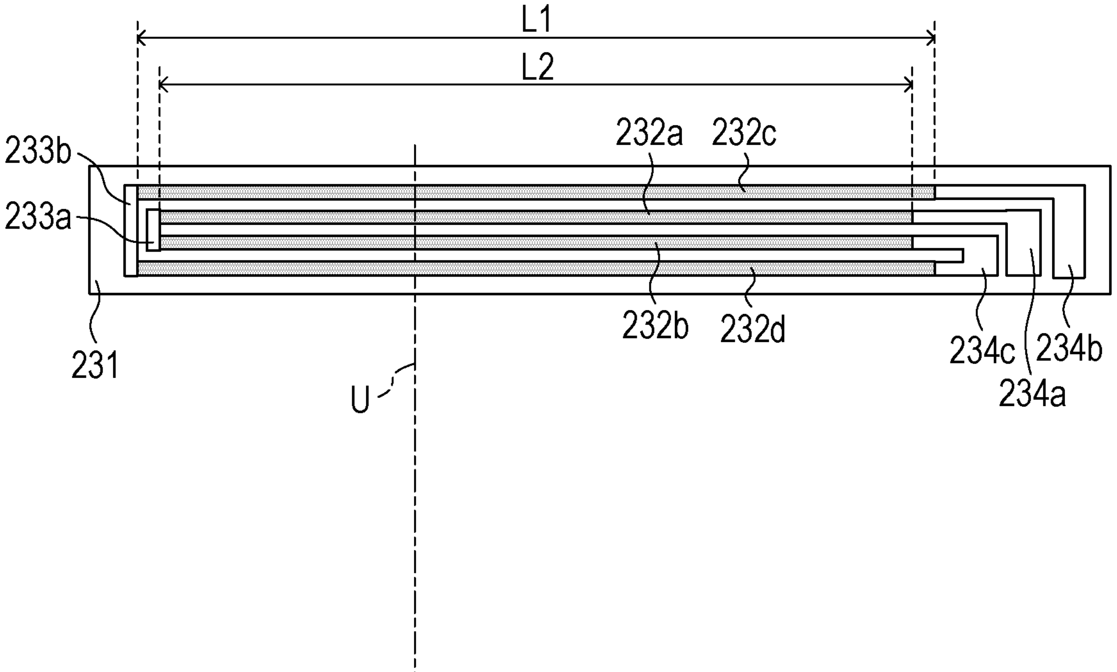
FIGS. 9A and 9B are schematic illustrations of a heater in the longitudinal direction.
Figure 9B:
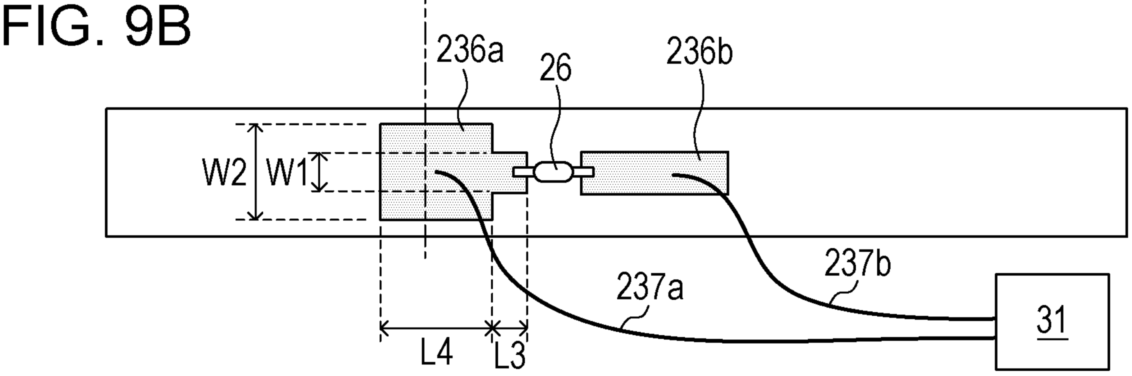

In FIGS. 9A and 9B, the conductor 236*a* is disposed so as to overlap the heating elements 232*a*, 232*b*, 232*c*, and 232*d* as viewed in the thickness direction of the substrate 231. The conductor 236*b* is disposed so as to overlap the heating elements 232*a* and 232*b*. Even such a shape of the conductor 236 can reduce the variation of the temperature response of the temperature detection element 26.

Figure 10A:
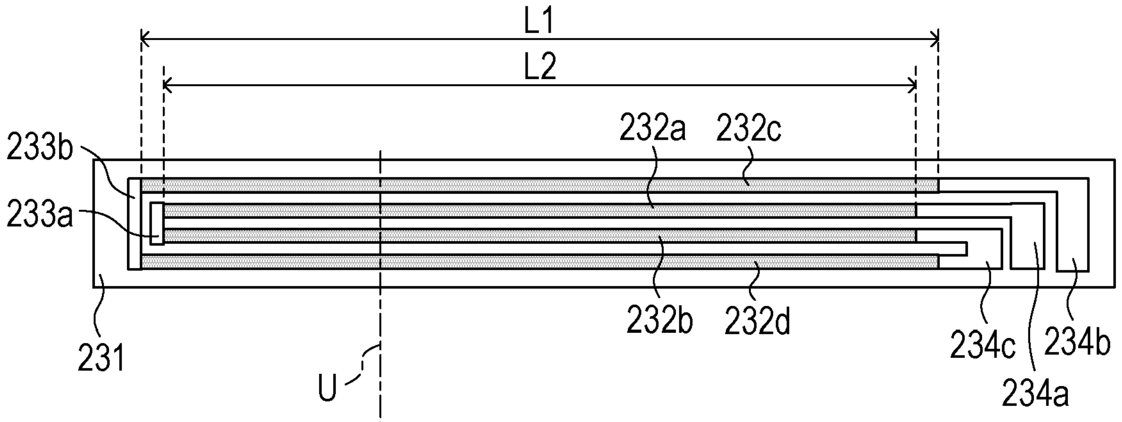
FIGS. 10A and 10B are schematic illustrations of a heater in the longitudinal direction.
Figure 10B:
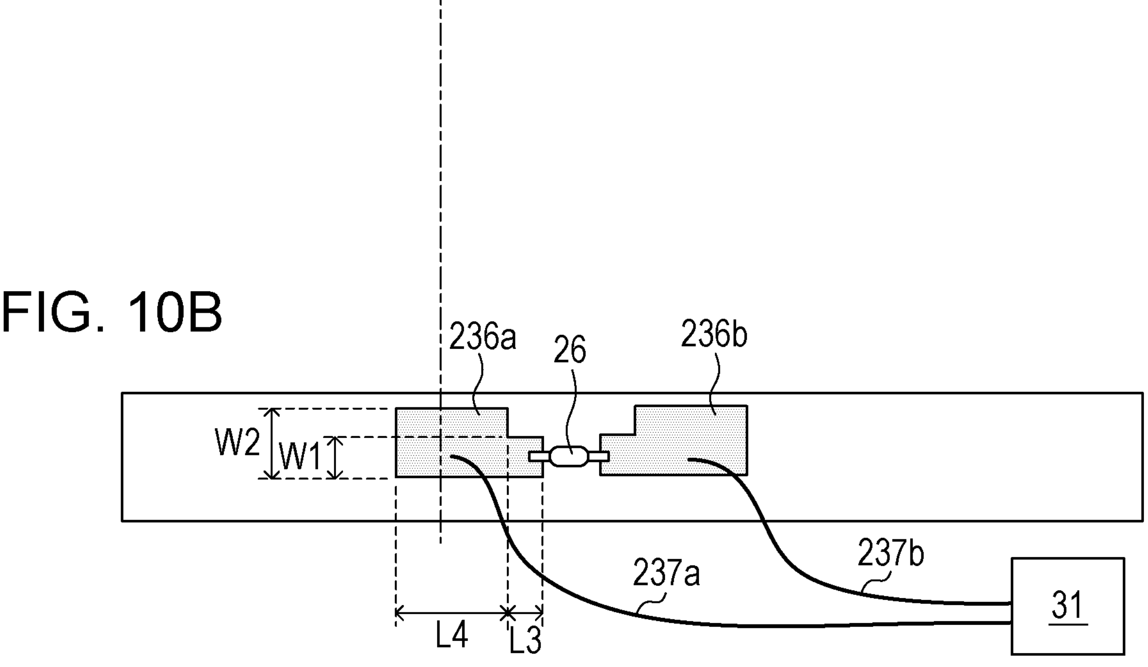
Figure 11:
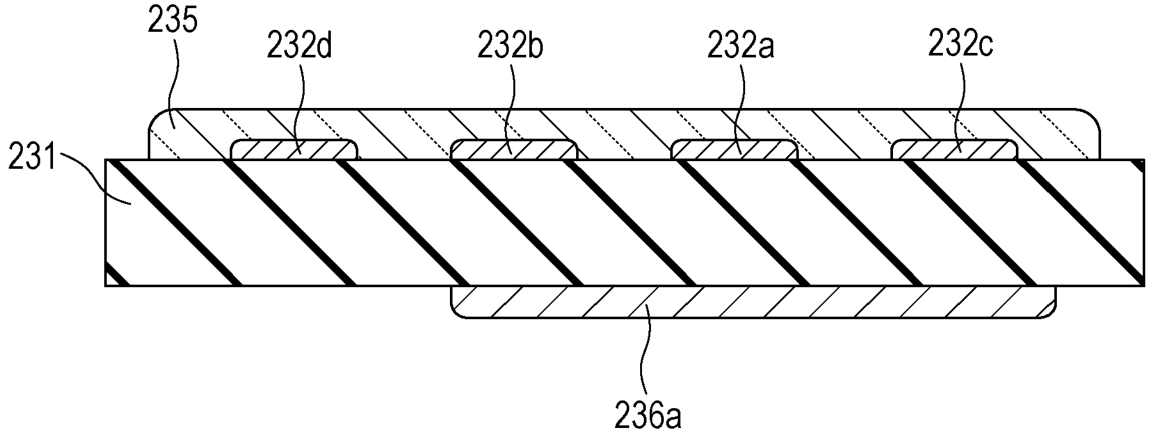
FIG. 11 is a cross-sectional view of the heater.

Furthermore, in FIGS. 10A and 10B and FIG. 11, the conductors 236*a* and 236*b* are disposed so as to overlap the heating elements 232*a*, 232*b*, and 232*c* as viewed in the thickness direction of the substrate 231. Even such a shape of the conductor 236 can reduce the variation of the temperature response of the temperature detection element 26.

Second Embodiment

The configuration of a heater 23 according to the present embodiment is described below. The same configurations as those of the first embodiment are identified by the same reference numerals without further description.

Figure 12:
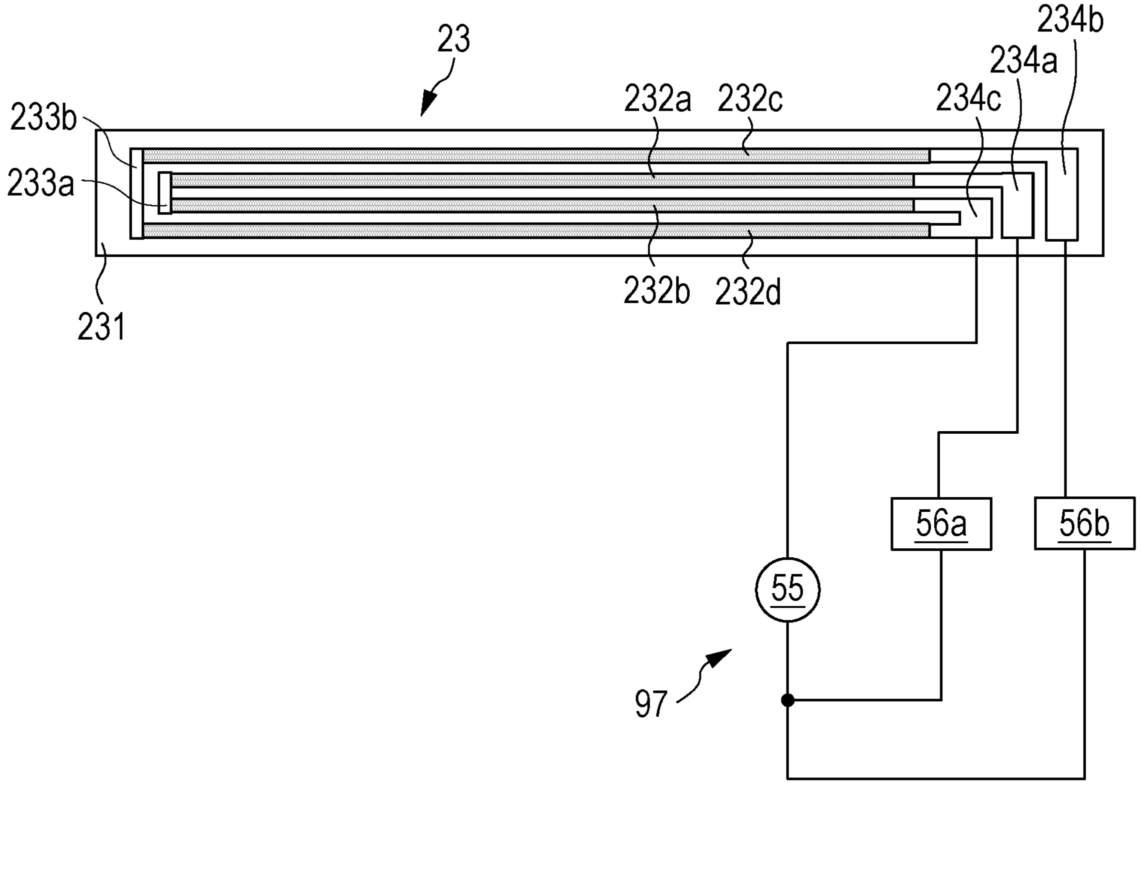
FIG. 12 is a schematic illustration of a power control unit.

FIG. 12 is a schematic illustration of a power control unit 97, which is a control circuit of the fixing device F1. According to the present embodiment, instead of the switch 57 used in the first embodiment, triacs 56*a* and 56*b* are used to select the heating element that is to be supplied with electric power. The power control unit 97 supplies power from the AC power supply 55 to the heating elements 232*a* and 232*b* by turning on the triac 56*a* and cuts off the power by turning off the triac 56*a*. In addition, the power control unit 97 supplies power from the AC power supply 55 to the heating elements 232*c* and 232*d* by turning on the triac 56*b* and cuts off the power by turning off the triac 56*b*. Note that since supply of power to the heating elements 232 is controlled by using the triacs 56, the heating elements 232*a*, 232*b*, 232*c*, and 232*d* can simultaneously generate heat if both triacs 56*a* and 56*b* are turned on. As described above, the switching of the power supply to the plurality of heating elements 232 having different lengths in the longitudinal direction does not necessarily have to be exclusive, and the plurality of heating elements 232 may simultaneously generate heat during a certain period.

Like the first embodiment described above, the conductors 236*a* and 236*b* connected to the temperature detection element 26 and the heating elements 232*a*, 232*b*, 232*c*, and 232*d* are disposed so as to overlap each other as viewed in the thickness direction of the substrate 231. As a result, no matter which heating element 232 generates heat, the heat generated by the heating element 232 is transferred to the temperature detection element 26 connected to the conductors 236*a* and 236*b* via the conductors 236*a* and 236*b* which are high heat conductors.

Thus, the heat generated by the heating element 232 can be efficiently transferred to the temperature detection element 26 as compared to the case where the conductors 236*a* and 236*b* do not overlap the heating elements 232 as viewed in the thickness direction of the substrate 231.

Third Embodiment

The configuration of a heater 23 according to the present embodiment is described below. The same configurations as those of the first and second embodiments are identified by the same reference numerals without further description.

Figure 13A:
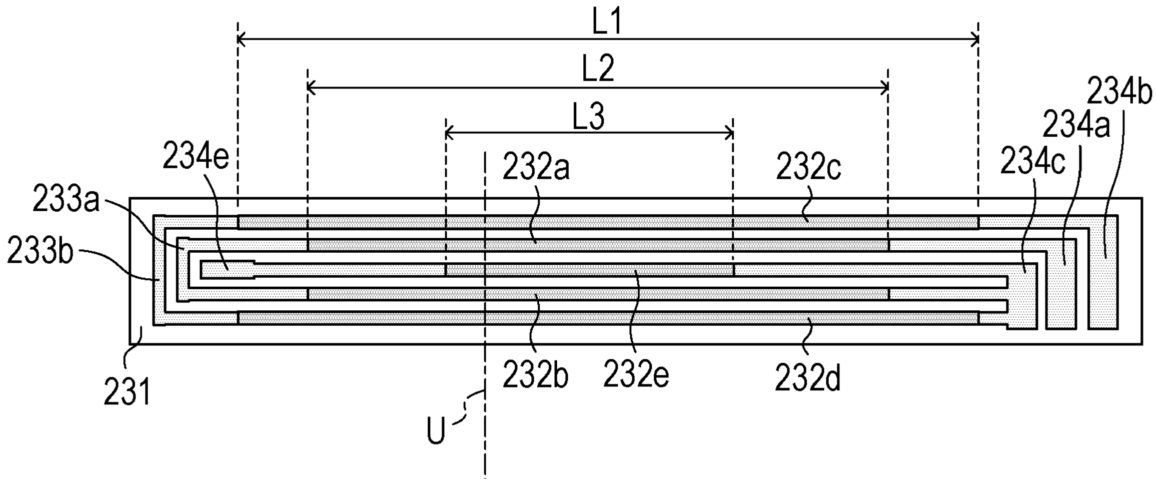
FIGS. 13A and 13B are schematic illustrations of a heater in the longitudinal direction.
Figure 13B:
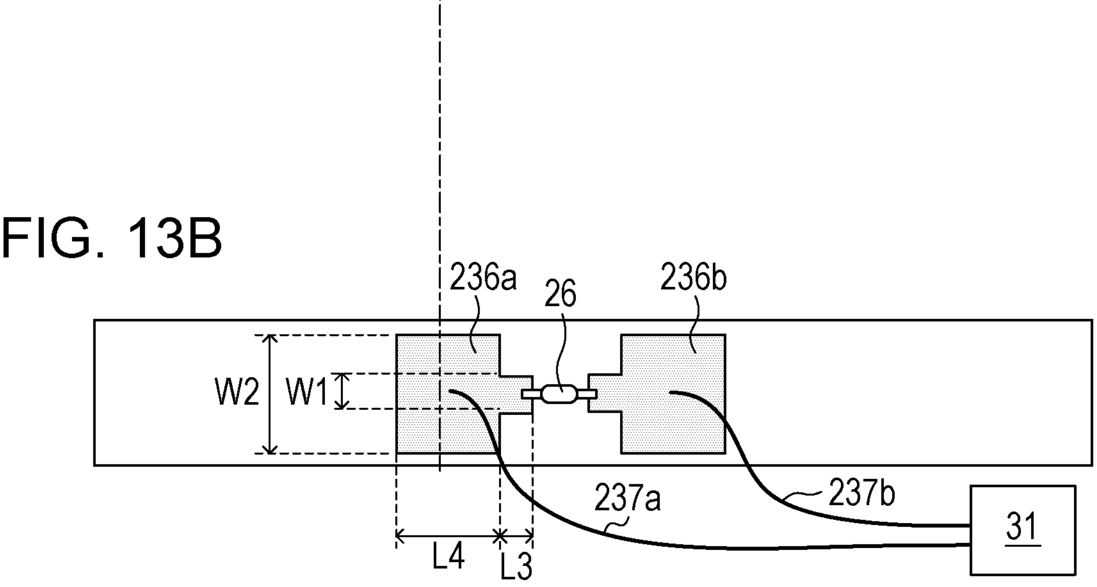
Figure 14:
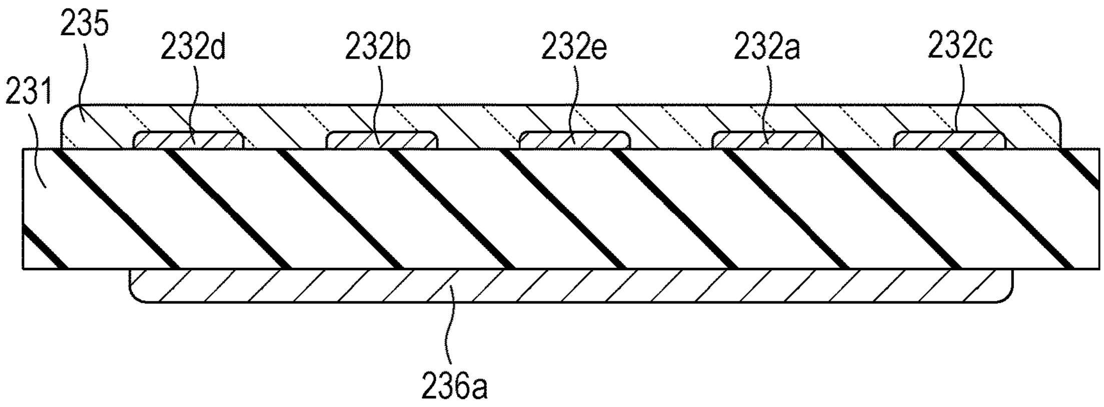
FIG. 14 is a cross-sectional view of the heater.

FIGS. 13A and 13B are schematic illustrations of a heater 23 in the longitudinal direction. FIG. 13A illustrates a first surface (also referred to as a front surface) of a substrate having heating elements thereon, and FIG. 13B illustrates the second surface (also referred to as a back surface side) of the substrate. FIG. 14 is a schematic cross-sectional view of the heater 23 taken along a line U of FIGS. 13A and 13B.

The heating elements 232*c* and 232*d* are disposed so as to be closest to the ends of the substrate 231 in the lateral direction. In this example, a length L1=222 mm, the width is 0.7 mm, and the thickness is 10 μm. The heating elements 232*a* and 232*b* are disposed so as to be closer to the center of the substrate 231 than the heating elements 232*c* and 232*d* in the lateral direction of the substrate 231, respectively. In this example, a length L2=180 mm, the width is 0.7 mm, and the thickness is 10 μm. A heating element 232*e* is disposed so as to be closer to the center of the substrate 231 than each of the heating elements 232*a* and 232*b* in the lateral direction of the substrate 231. In this example, a length L3=150 mm, the width is 0.7 mm, and the thickness is 10 μm. The spacing between two adjacent heating elements 232 is 0.6 mm. The width of the substrate 231 in the lateral direction is 8.0 mm. Furthermore, in this example, the total resistance value of the heating elements 232*c* and 232*d* is 20Ω, the total resistance value of the heating elements 232*a* and 232*b* is 18Ω, and the total resistance value of the heating element 232*e* is 18Ω.

The temperature detection element 26 is disposed on the surface of the substrate 231 opposite the surface having the heating elements 232 thereon. Conductors 236*a* and 236*b* are connected to the temperature detection element 26. The conductors 236*a* and 236*b* are disposed so as to overlap the heating elements 232*a*, 232*b*, 232*c*, 232*d* and 232*e* as viewed in the thickness direction of the substrate 231. In this example, the conductors 236*a* and 236*b* have a width W1=2.0 mm and a width W2=7.0 mm. In addition, a length L3=2.0 mm, and a length L4=6.0 mm.

The length L1 of the heating elements 232*c* and 232*d* is a toner image fixable length for the sheet S having the largest width among various types of sheets S printable (or conveyable) by the image forming apparatus.

For example, the heating elements 232*c* and 232*d* are used when a toner image is fixed to a LTR size sheet S having a width of 216 mm. The heating elements 232*a* and 232*b* are used when a toner image is fixed to a sheet S having a width less than a B5 size width of 182 mm and greater than an A5 size width of 148 mm. The heating element 232*e* is used when a toner image is fixed to a sheet S having a paper width less than or equal to the A5 size width.

Figure 15:
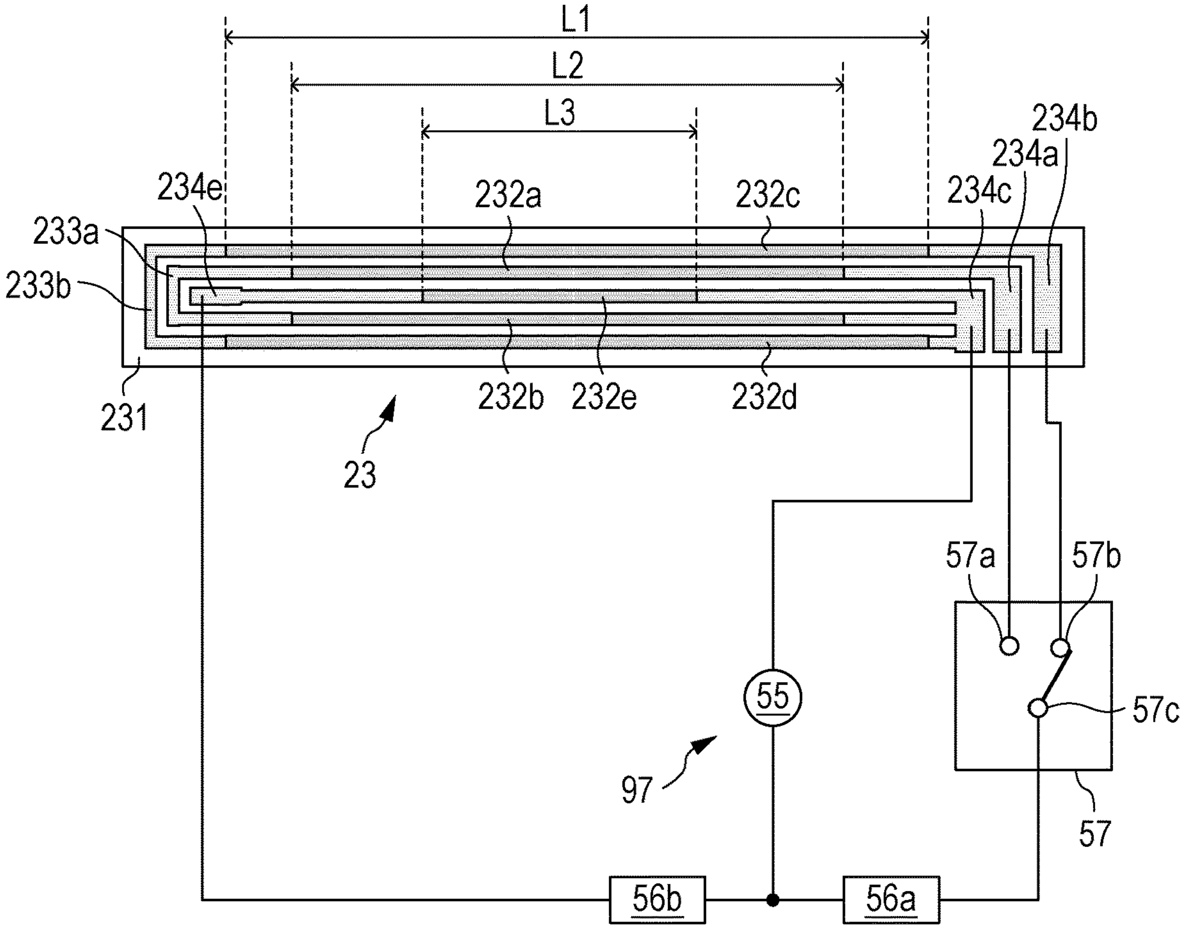
FIG. 15 is a schematic illustration of a power control unit.

FIG. 15 is a schematic illustration of a power control unit 97, which is a control circuit of the fixing device F1. Note that since a power distribution circuit for the heating elements 232*c* and 232*d* and the heating elements 232*a* and 232*b* and a switching operation are the same as those of the first embodiment, detailed description is not given here. The heating element 232*e* is connected to electrodes 234*e* and 234*c* and is further connected to an AC power supply 55 via a triac 56*b*. Connection to the heating elements 232*c* and 232*d* and connection to the heating elements 232*a* and 232*b* are switched between by the switch 57, and the triac 56*a* controls the power distribution status.

The power distribution status of the heating element 232*e* is controlled by the triac 56*b*.

The conductors 236*a* and 236*b* connected to the temperature detection element 26 and the heating elements 232*a*, 232*b*, 232*c*, 232*d*, and 232*e* are disposed so as to overlap each other as viewed in the thickness direction of the substrate 231. As a result, no matter which heating element 232 generates heat, the heat generated by the heating element 232 is transferred to the temperature detection element 26 connected to the conductors 236*a* and 236*b* via the conductors 236*a* and 236*b* which are high heat conductors. Thus, the heat generated by the heating element 232 can be efficiently transferred to the temperature detection element 26 as compared to the case where the conductors 236*a* and 236*b* do not overlap the heating elements 232 as viewed in the thickness direction of the substrate 231.

Modification

While, as an example, the conductors 236*a* and 236*b* that overlap all the heating elements 232 have been described with reference to FIGS. 13A and 13B and FIG. 14, the configuration is not limited thereto. Any shape and material of the conductor 236 can be employed as long as the conductor 236 overlaps, among all the heating elements 232, the one having a relatively long distance from the temperature detection element 26 at least in the lateral direction of the substrate 231. The larger the area where the conductor 236 and the heating elements 232 overlap each other, the greater the effect. However, if even only part of the conductor 236 overlaps the heating element 232, the variation of the temperature response of the temperature detection element 26 can be reduced as compared to the case where the conductor 236 does not overlap the heating elements 232 at all.

Figure 16:
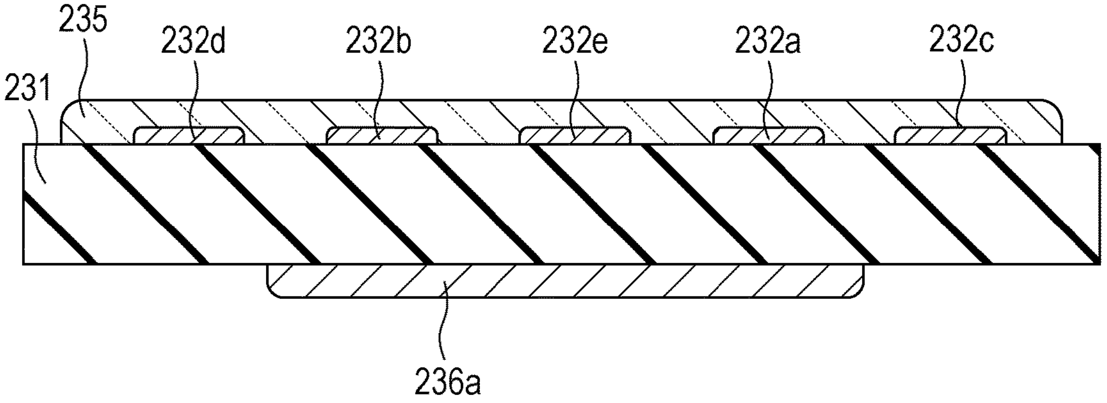
FIG. 16 is a cross-sectional view of the heater.

FIG. 16 is a schematic cross-sectional view of the heater 23. The conductors 236*a* and 236*b* are disposed so as to overlap the heating elements 232*a*, 232*b*, and 232*e* as viewed in the thickness direction of the substrate 231. In this example, the conductors 236*a* and 236*b* have a width W1=2.0 mm and a width W2=5.0 mm. In addition, a length L3=2.0 mm, and a length L4=6.0 mm.

The heating elements 232*a*, 232*b*, and 232*e* are used when a small-sized sheet S is subjected to a fixing process. Small-sized sheets S including an envelope have a variety of widths, and a sheet S having a width other than B5 or A5 size width may be subjected to a fixing process. In particular, when a sheet S having an intermediate size between B5 and A5 size widths is subjected to a fixing process, the heating elements 232*a* and 232*b* having a length L2 optimal for B5 size and the heating element 232*e* having a length L3 optimal for A5 size alternately generate heat by a constant fraction. Since the conductors 236*a* and 236*b* are disposed so as to overlap the heating elements 232*a*, 232*b*, and 232*e* as viewed in the thickness direction of the substrate 231, the variation of the temperature response of the temperature detection element 26 can be reduced even if the heating elements 232 are frequently switched between in accordance with the width of a sheet S.

Figure 17A:
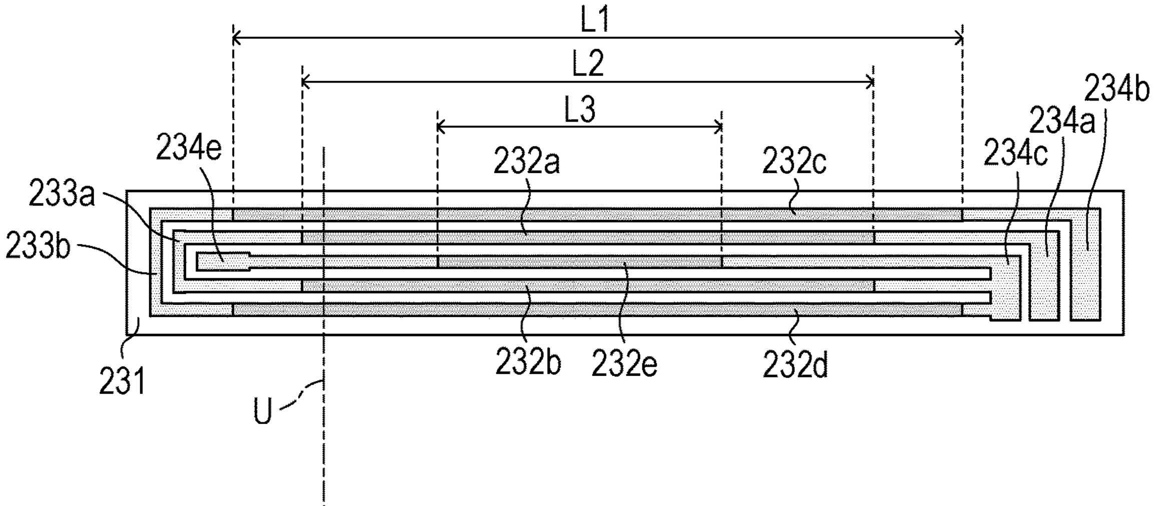
FIGS. 17A and 17B are schematic illustrations of a heater in the longitudinal direction.
Figure 17B:
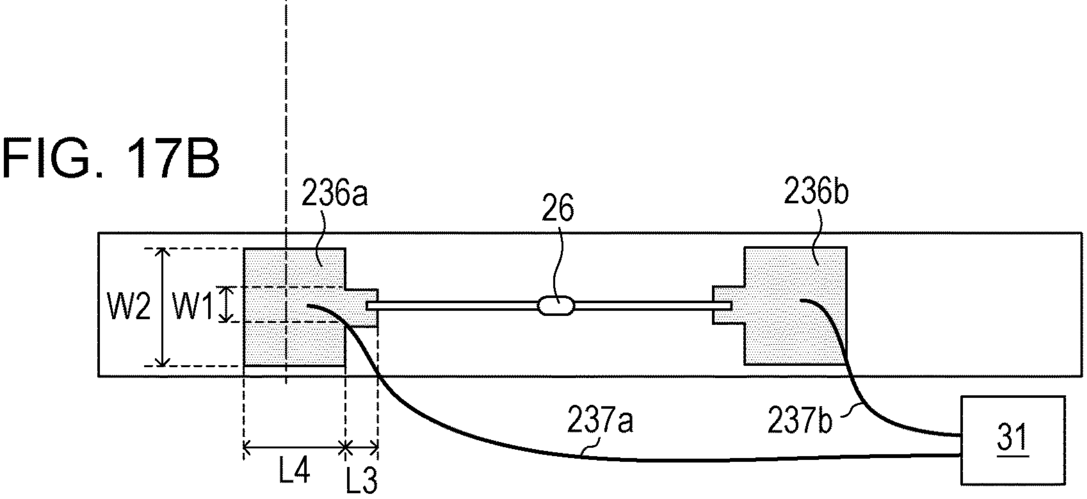
Figure 18:
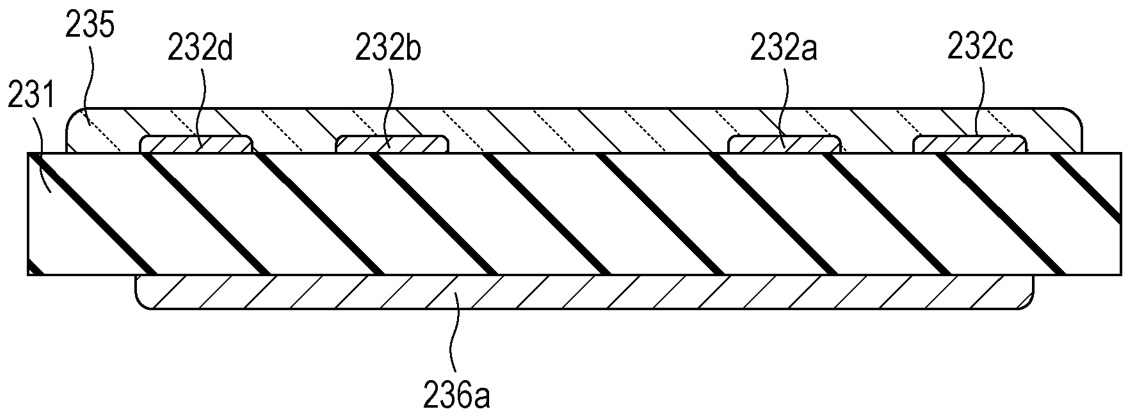
FIG. 18 is a cross-sectional view of the heater.

FIGS. 17A and 17B are schematic illustrations of the heater 23 in the longitudinal direction. FIG. 17A illustrates a first surface (also referred to as a front surface) of a substrate having heating elements thereon, and FIG. 17B illustrates the second surface (also referred to as a back surface side) of the substrate. FIG. 18 is a schematic cross-sectional view of the heater 23 taken along a line U of FIGS. 17A and 17B.

The conductors 236*a* and 236*b* connected to the temperature detection element 26 and the heating elements 232*a*, 232*b*, 232*c*, and 232*d* are disposed so as to overlap each other as viewed in the thickness direction of the substrate 231. The heating elements 232*a*, 232*b*, 232*c*, and 232*d* are disposed at a relatively longer distance from the temperature detection element 26 than the heating element 232*e* in the lateral direction of the substrate 231. Even in such a configuration, the heat generated by the heating elements 232*a*, 232*b*, 232*c*, and 232*d* is transferred to the temperature detection element 26 connected to the conductors 236*a* and 236*b* via the conductors 236*a* and 236*b*, which are high heat conductors. Thus, the heat generated by the heating element 232 can be efficiently transferred to the temperature detection element 26 as compared to the case where the conductors 236*a* and 236*b* do not overlap the heating elements 232 as viewed in the thickness direction of the substrate 231.

Fourth Embodiment

The configuration of a heater 23 according to the present embodiment is described below. The same configurations as those of the first to third embodiments are identified by the same reference numerals without further description.

Figure 19A:
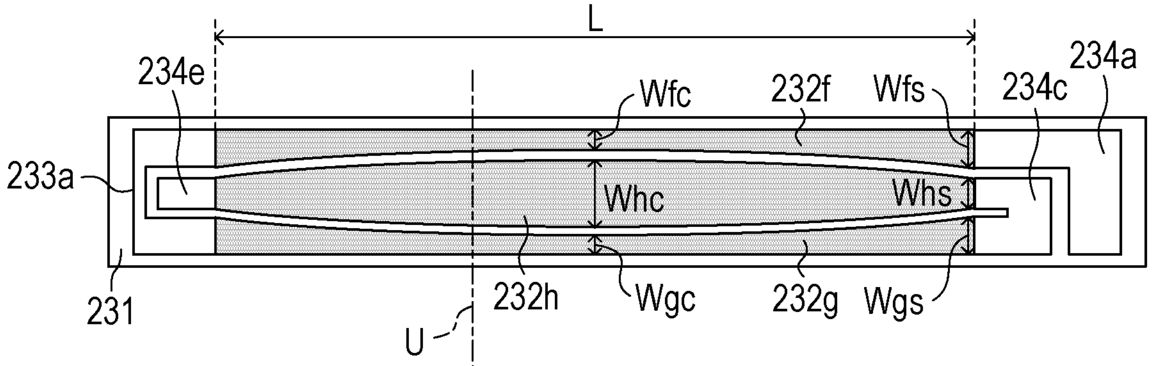
FIGS. 19A and 19B are schematic illustrations of a heater in the longitudinal direction.
Figure 19B:
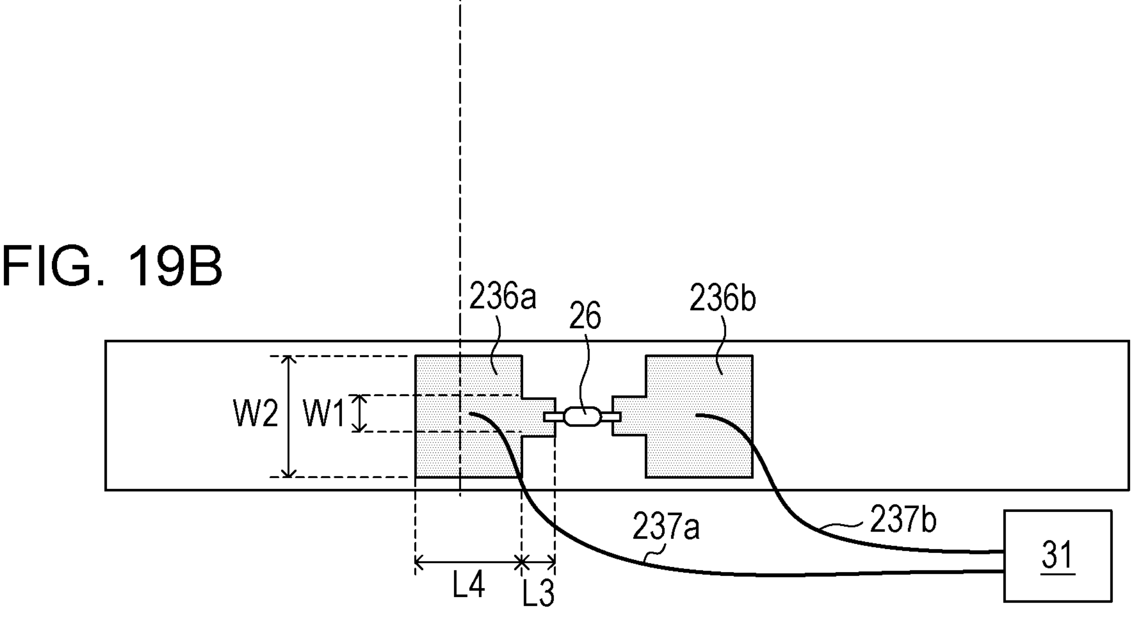
Figure 20:
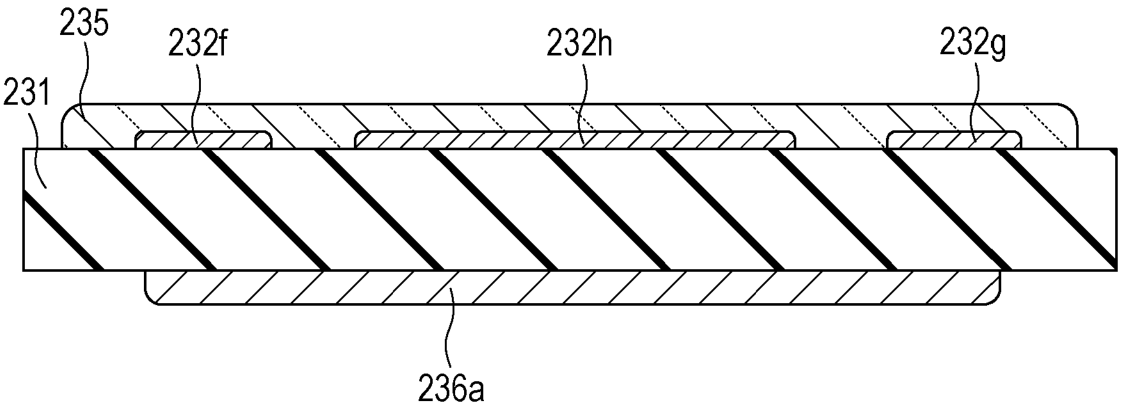
FIG. 20 is a cross-sectional view of the heater.

FIGS. 19A and 19B are schematic illustrations of a heater 23 in the longitudinal direction. FIG. 19A illustrates a first surface (also referred to as a front surface) of a substrate having heating elements thereon, and FIG. 19B illustrates the second surface (also referred to as a back surface side) of the substrate. FIG. 20 is a schematic cross-sectional view of the heater 23 taken along a line U of FIGS. 19A and 19B. A heating element 232*h* is disposed in the center of the substrate 231 in the lateral direction. The heating element 232*h* has a heating element pattern in which the amount of generated heat is greater at the end portions than at the center in the longitudinal direction of the substrate 231. In this example, the resistance value is 18Ω. The heating elements 232*f* and 232*g* are disposed adjacent to the ends of the substrate 231 in the lateral direction. The heating elements 232*f* and 232*g* have a heating element pattern in which the amount of generated heat is less at the end portions than at the center in the longitudinal direction of the substrate 231. The heating elements 232*f* and 232*g* are connected in series via the conductor 233*a*. In this example, the total resistance value is 20Ω.

The heating elements 232*f*, 232*g*, and 232*h* have a shape in which the width continuously changes in the longitudinal direction of the substrate 231. In this example, let Wfc and Wgc be the widths of the heating elements 232*f* and 232*g*, respectively, in the central portion in the longitudinal direction of the substrate 231. Then, Wfc=Wgc=0.7 mm. Let Whc be the width of the heating element 232*h* in the central portion. Then, Whc=3.2 mm. Let Wfs and Wgs be the widths of the heating elements 232*f* and 232*g*, respectively, in the end portions of the substrate 231 in the longitudinal direction. Then, Wfs=Wgs=1.6 mm. Let Whs be the width of the heating element 232*h* in the end portions. Then, Whs=0.7 mm.

Let L be the length of the heating elements 232*f*, 232*g*, and 232*h* in the longitudinal direction of the substrate 231. Then, the Length L=222 mm. The spacing between two adjacent heating elements in the lateral direction of the substrate 231 is 0.6 mm. The width of the substrate 231 is 7.0 mm.

The temperature detection element 26 is disposed on the surface of the substrate 231 opposite the surface having the heating element 232 thereon. Conductors 236*a* and 236*b* are connected to the temperature detection element 26. The conductors 236*a* and 236*b* are disposed so as to overlap the heating elements 232*f*, 232*g*, and 232*h* as viewed in the thickness direction of the substrate 231. In this example, the conductors 236*a* and 236*b* have a width W1=2.0 mm and a width W2=6.0 mm. In addition, a length L3=2.0 mm, and a length L4=6.0 mm.

Figure 21:
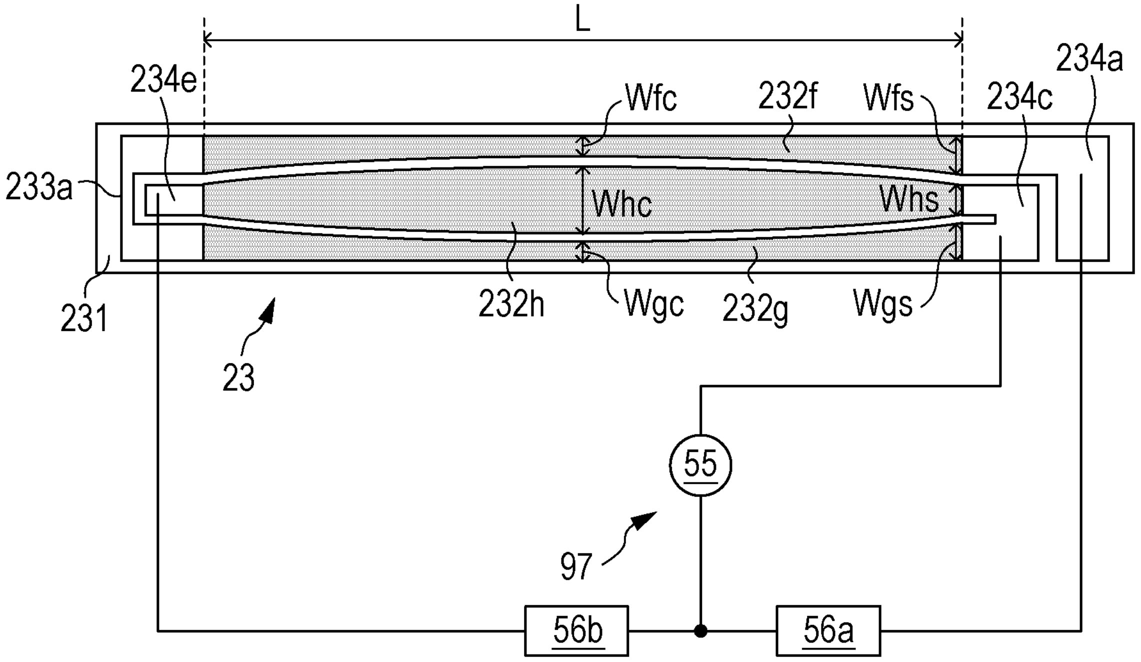
FIG. 21 is a schematic illustration of a power control unit.

FIG. 21 is a schematic illustration of a power control unit 97, which is a control circuit of the fixing device F1. The heating element 232*h* is connected to the electrodes 234*e* and 234*c* and is connected to the AC power supply 55 via the triac 56*b*. The heating elements 232*f* and 232*g* are connected to the electrodes 234*a* and 234*c*, respectively, and are connected to the AC power supply 55 via the triac 56*a*. Power supply to the heating element 232*h* is controlled by the triac 56*a*. Power supply to the heating elements 232*f* and 232*g* is controlled by the triac 56*b*.

The heating element 232*h* has a pattern in which the amount of generated heat increases toward the end of the substrate 231 in the longitudinal direction. The heating elements 232*f* and 232*g* have a pattern in which the amount of generated heat decreases toward the end in the longitudinal direction of the substrate 231. By controlling the power distribution ratio of two heating elements, the amount of heat generated in the longitudinal direction can be controlled. The power distribution ratio of the two heating elements is determined in accordance with the size of a sheet S to be used and the like.

The conductors 236*a* and 236*b* connected to the temperature detection element 26 and the heating elements 232*f*, 232*g*, and 232*h* are disposed so as to overlap each other as viewed in the thickness direction of the substrate 231. As a result, no matter which heating element 232 generates heat, the heat generated by the heating element 232 is transferred to the temperature detection element 26 connected to the conductors 236*a* and 236*b* via the conductors 236*a* and 236*b*, which are high heat conductors. Thus, the heat generated by the heating element 232 can be efficiently transferred to the temperature detection element 26 as compared to the case where the conductors 236*a* and 236*b* do not overlap the heating elements 232 as viewed in the thickness direction of the substrate 231.

Fifth Embodiment

The configuration of a heater 23 according to the present embodiment is described below. The same configurations as those of the first to fourth embodiments are identified by the same reference numerals without further description.

Figure 22A:
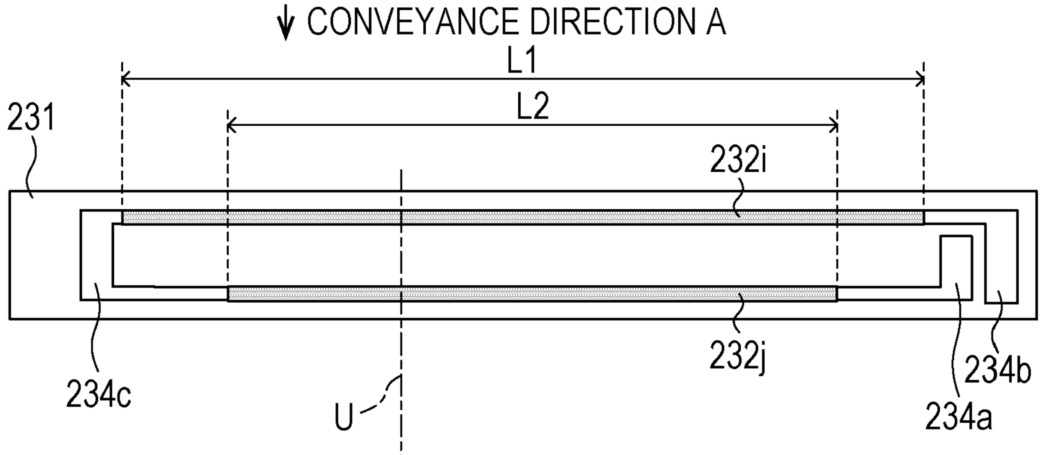
FIGS. 22A and 22B are schematic illustrations of a heater in the longitudinal direction.
Figure 22B:
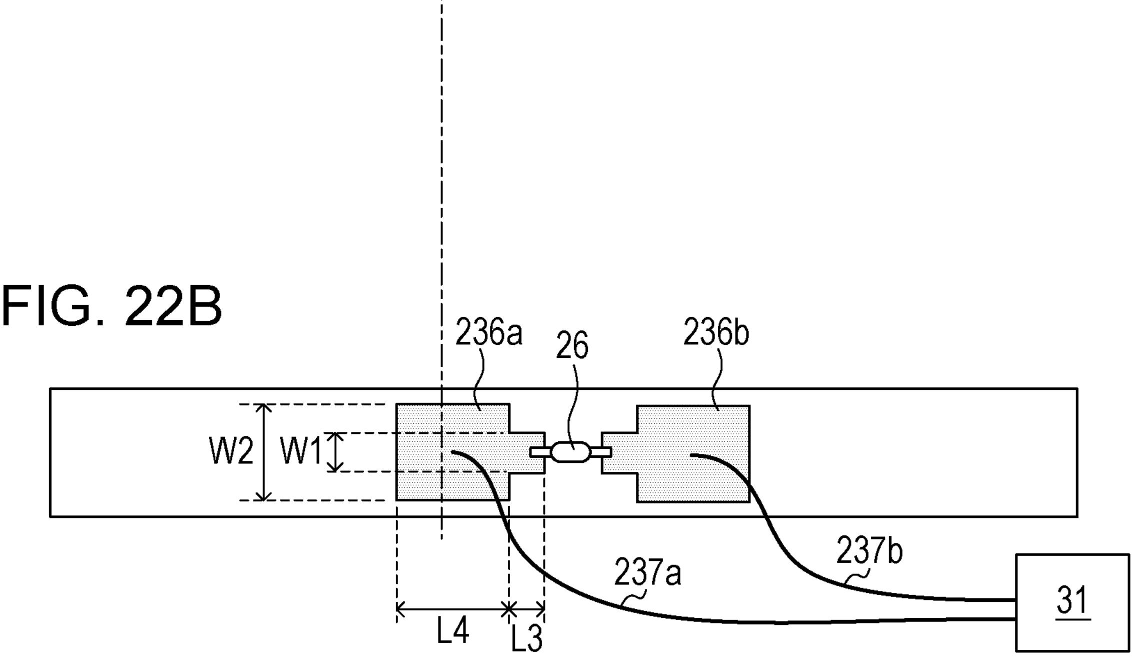
Figure 23:
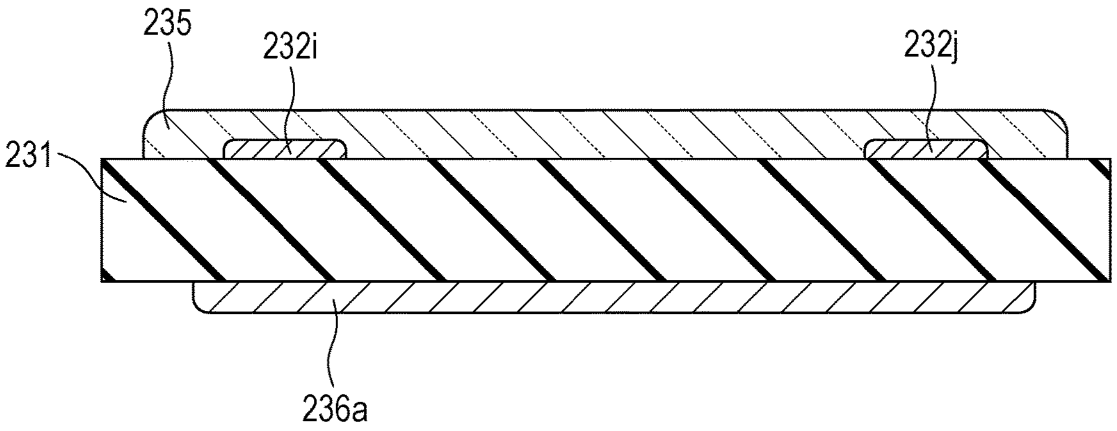
FIG. 23 is a cross-sectional view of the heater.

FIGS. 22A and 22B are schematic illustrations of a heater 23 in the longitudinal direction. FIG. 22A illustrates a first surface (also referred to as a front surface) of a substrate having heating elements thereon, and FIG. 22B illustrates the second surface (also referred to as a back surface side) of the substrate. FIG. 23 is a schematic cross-sectional view of the heater 23 taken along a line U of FIGS. 22A and 22B. Heating elements 232*i* and 232*j* have different lengths in the longitudinal direction of the substrate 231. That is, the shape of the heater 23 is asymmetrical in the lateral direction. The heating element 232*i* is disposed on the upstream side in a conveyance direction A of the sheet S, and the heating element 232*j* is disposed on the downstream side. In this example, the heating element 232*i* has a length L1=222 mm, a width=0.7 mm, and a thickness=10 μm. The heating element 232*j* has a length L2=180 mm, a width=0.7 mm, and a thickness=10 μm.

The length L1 of the heating element 232*i* is a toner image fixable length for the sheet S having the largest width (hereinafter, also referred to as the largest paper passing width) among various types of sheets S printable (or conveyable) by the image forming apparatus. The heating element 232*j* is used when a toner image is fixed to a sheet S having a paper width less than or equal to the B5 size width (182 mm).

Figure 24:
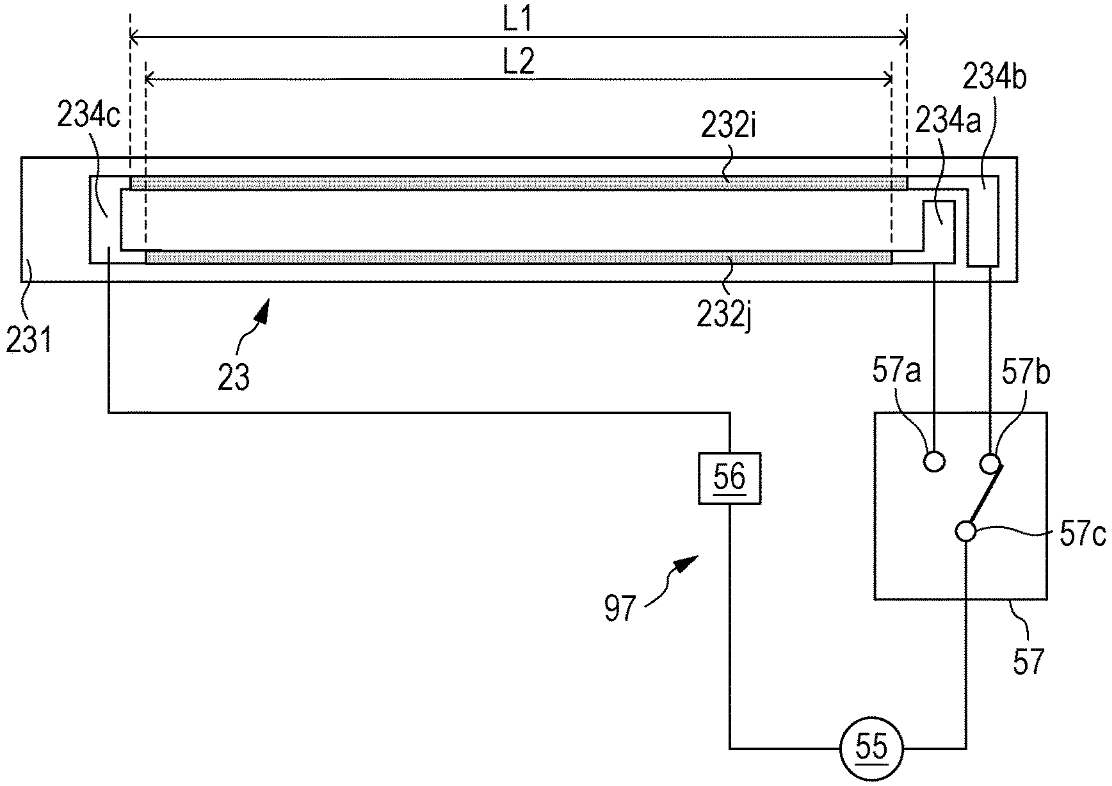
FIG. 24 is a schematic illustration of a power control unit.
Figure 25A:
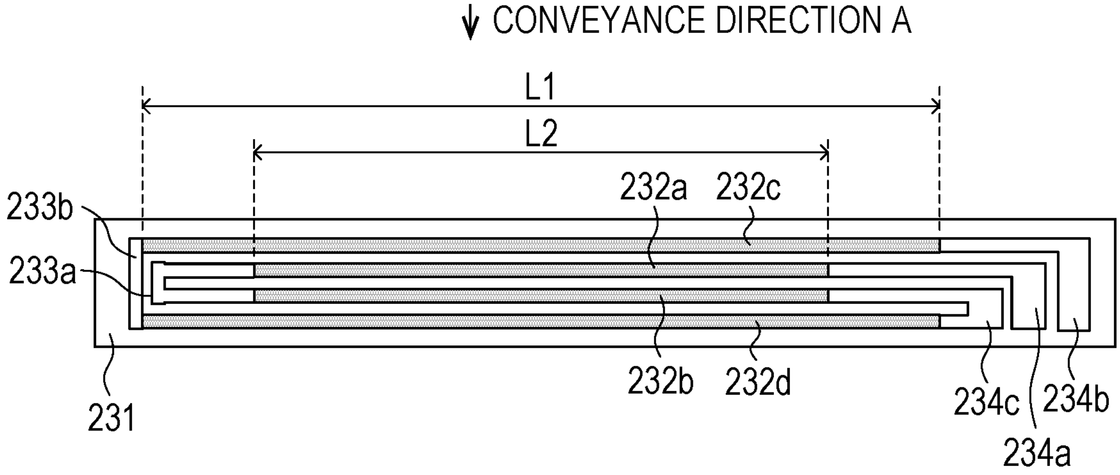
FIGS. 25A and 25B are schematic illustrations of an existing heater in the longitudinal direction.
Figure 25B:
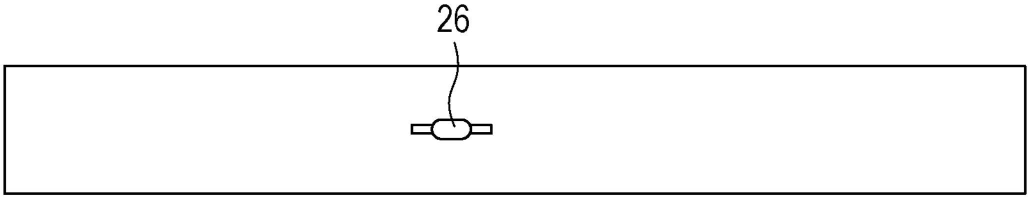

FIG. 24 is a schematic illustration of the power control unit 97, which is a control circuit of the fixing device F1. Like the above-described power control unit 97 according to the first embodiment, by switching the switch 57 in accordance with the width of a sheet S, it is selectable which one of the heating elements 232*i* and 232*j* generates heat.

The temperature detection element 26 is disposed on the surface of the substrate 231 opposite the surface having the heating element 232 thereon. The temperature detection element 26 is disposed at a substantial center position in the longitudinal direction and the lateral direction of the substrate 231 and, the conductor 236*a* and the conductor 236*b* are connected to the temperature detection element 26. The conductors 236*a* and 236*b* are disposed so as to overlap the heating elements 232*i* and 232*j* as viewed in the thickness direction of the substrate 231.

The heating elements 232*i* and 232*j* are disposed at the same distances from the temperature detection element 26 in the lateral direction of the substrate 231. The heating element 232*i* is disposed on the upstream side in the conveyance direction, and the heating element 232*j* is disposed on the downstream side. The fixing film 22 is heated at the nip portion NF by the heater 23 while moving in the conveyance direction A. The heat from the heating element 232*i* disposed upstream of the nip portion NF is easily transferred to the temperature detection element 26 with the rotation of the fixing film 22, and the heat from the heating element 232*j* disposed downstream of the nip portion NF is less likely to be transferred to the temperature detection element 26. The temperature response of the temperature detection element 26 may vary between when the heating element 232*i* generates heat and when the heating element 232*j* generates heat while the fixing film 22 is being rotated.

The conductors 236*a* and 236*b* connected to the temperature detection element 26 and the heating elements 232*i* and 232*f* are disposed so as to overlap each other as viewed in the thickness direction of the substrate 231. As a result, no matter which heating element 232 generates heat, the heat generated by the heating element 232 is transferred to the temperature detection element 26 connected to the conductors 236*a* and 236*b* via the conductors 236*a* and 236*b*, which are high heat conductors. Thus, the heat generated by the heating element 232 can be efficiently transferred to the temperature detection element 26 as compared to the case where the conductors 236*a* and 236*b* do not overlap the heating elements 232 as viewed in the thickness direction of the substrate 231.

According to the configuration of the present disclosure, variation of the temperature response of the thermistor can be reduced.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-160999 filed Sep. 30, 2021, which is hereby incorporated by reference herein in its entirety.

What is claimed is:

1. A heater comprising:

a substrate having an elongated shape;

a first heating element and a second heating element disposed on a first surface of the substrate;

a temperature detection element disposed on a second surface of the substrate opposite the first surface of the substrate; and a conductor disposed on the second surface and connected to the temperature detection element, wherein the first heating element has a first distance from the temperature detection element in a lateral direction of the substrate orthogonal to a longitudinal direction of the substrate, and the second heating element has a second distance that is greater than the first distance from the temperature detection element in the lateral direction, and wherein, as viewed in a thickness direction of the substrate orthogonal to the lateral direction and the longitudinal direction of the substrate, the conductor overlaps the first heating element and the second heating element.

2. The heater according to claim 1, wherein the conductor includes a first conductor and a second conductor, and wherein, as viewed in the thickness direction of the substrate, the first conductor overlaps the first heating element and the second heating element, and the second conductor overlaps the first heating element and the second heating element.

3. The heater according to claim 1, wherein the conductor includes a first conductor and a second conductor, and wherein, as viewed in the thickness direction of the substrate, the first conductor overlaps the first heating element and the second heating element, and the second conductor overlaps the first heating element.

4. The heater according to claim 1, wherein a length of the first heating element is a first length, and a length of the second heating element is a second length that is greater than the first length of the first heating element in the longitudinal direction of the substrate.

5. The heater according to claim 4, further comprising:

a third heating element disposed on the first surface of the substrate and having the first length; and a fourth heating element disposed on the first surface of the substrate and having the second length, wherein the second heating element, the first heating element, the third heating element, and the fourth heating element are sequentially disposed from an end of the substrate in the lateral direction.

6. The heater according to claim 5, wherein the conductor includes a first conductor and a second conductor, and wherein, as viewed in the thickness direction of the substrate, the first conductor overlaps the first heating element, the second heating element, the third heating element, and the fourth heating element, and the second conductor overlaps the first heating element, the second heating element, the third heating element, and the fourth heating element.

7. The heater according to claim 5, wherein the conductor includes a first conductor and a second conductor, and wherein, as viewed in the thickness direction of the substrate, the first conductor overlaps the first heating element, the second heating element, the third heating element, and the fourth heating element, and the second conductor overlaps the first heating element and the third heating element.

8. The heater according to claim 5, further comprising a fifth heating element disposed on the first surface of the substrate and having a third length that is less than the first length, wherein the second heating element, the first heating element, the fifth heating element, the third heating element, and the fourth heating element are sequentially disposed from the end of the substrate in the lateral direction.

9. The heater according to claim 8, wherein the conductor includes a first conductor and a second conductor, and wherein, as viewed in the thickness direction of the substrate, the first conductor overlaps the first heating element, the second heating element, the third heating element, the fourth heating element, and the fifth heating element, and the second conductor overlaps the first heating element, the second heating element, the third heating element, the fourth heating element, and the fifth heating element.

10. The heater according to claim 8, wherein the conductor includes a first conductor and a second conductor, and wherein, as viewed in the thickness direction of the substrate, the first conductor overlaps the first heating element, the third heating element, and the fifth heating element, and the second conductor overlaps the first heating element, the third heating element, and the fifth heating element.

11. The heater according to claim 8, wherein the conductor includes a first conductor and a second conductor, and wherein, as viewed in the thickness direction of the substrate, the first conductor overlaps the first heating element, the second heating element, the third heating element, and the fourth heating element, and the second conductor overlaps the first heating element, the second heating element, the third heating element, and the fourth heating element.

12. The heater according to claim 1, further comprising a third heating element disposed on the first surface of the substrate, wherein the first heating element has a width that is less in an end portion of the substrate than in a center portion in the longitudinal direction of the substrate, wherein each of the second heating element and the third heating element has a width that is greater in the end portion of the substrate than in the center portion in the longitudinal direction of the substrate, and wherein the second heating element, the first heating element, and the third heating element are sequentially disposed from an end of the substrate in the lateral direction.

13. The heater according to claim 12, wherein the conductor includes a first conductor and a second conductor, and wherein, as viewed in the thickness direction of the substrate, the first conductor overlaps the first heating element, the second heating element, and the third heating element, and the second conductor overlaps the first heating element, the second heating element, and the third heating element.

14. A heating device comprising:

the heater according to claim 1;

a film having a cylindrical shape and configured to be heated by the heater; and a pressure roller configured to form a nip portion along with the film, wherein the heater is disposed in an internal space of the film, the film is pinched by the heater and the pressure roller, and, in a case where an image formed on a sheet, the image formed on the sheet is heated in the nip portion via the film.

15. An image forming apparatus comprising:

an image forming unit configured to form an image on a sheet; and a heating device that includes:

the heater according to claim 1, a film having a cylindrical shape and configured to be heated by the heater, and a pressure roller configured to form a nip portion along with the film, wherein the heater is disposed in an internal space of the film, the film is pinched by the heater and the pressure roller, and, in a case where the image forming unit form the image on the sheet, the heating device heats the image formed on the sheet in the nip portion via the film to fix the image formed on the sheet to the sheet.

* * * * *